United States Patent [19]
Kato et al.

[11] Patent Number: 5,654,116
[45] Date of Patent: Aug. 5, 1997

[54] HOLOGRAM

[75] Inventors: Tetsuya Kato, Okazaki; Toshiki Saburi, Inazawa; Naoyuki Kawazoe, Yokkaichi; Yasuhiro Mizutani, Inabe-gun; Tomonori Ishikawa, Anjo, all of Japan

[73] Assignee: Nippondenso Co., Ltd., Kariya, Japan

[21] Appl. No.: 314,501

[22] Filed: Sep. 28, 1994

[30]  Foreign Application Priority Data

| Sep. 30, 1993 | [JP] | Japan | 5-269831 |
| Sep. 30, 1993 | [JP] | Japan | 5-269832 |
| Sep. 30, 1993 | [JP] | Japan | 5-269833 |
| Dec. 18, 1993 | [JP] | Japan | 5-344267 |

[51] Int. Cl.$^6$ ..................... G03H 1/02
[52] U.S. Cl. ............. 430/1; 430/2; 359/1; 359/3
[58] Field of Search ................ 430/1, 2, 290, 430/945; 359/1, 3; 525/524; 528/103, 112, 120

[56]  References Cited

U.S. PATENT DOCUMENTS

| 3,725,342 | 4/1973 | Porret et al. | 528/107 |
| 4,576,896 | 3/1986 | Suzuki et al. | 430/271 |
| 4,608,300 | 8/1986 | Gruber | 528/120 |
| 4,897,291 | 1/1990 | Kim | 427/393 |
| 5,172,250 | 12/1992 | Tsuchiya et al. | 359/1 |
| 5,196,261 | 3/1993 | Ono et al. | 521/51 |
| 5,281,499 | 1/1994 | Bussard | 430/1 |
| 5,313,317 | 5/1994 | Saburi et al. | 359/1 |

FOREIGN PATENT DOCUMENTS

| 2492997 | 4/1982 | France | 430/2 |
| 57-146283 | 9/1982 | Japan | |
| 60-217303 | 10/1985 | Japan | 430/2 |
| 1-40882 | 2/1989 | Japan | 430/2 |
| 4365085 | 12/1992 | Japan | 430/2 |
| 5203812 | 8/1993 | Japan | |
| 0585941 | 3/1994 | Japan | 430/2 |

OTHER PUBLICATIONS

May et al. "Epoxy Resins" (©1973) Macel Dekker, Inc. pp. 241–266, 273 & 409–419.

*Primary Examiner*—Martin Angebranndt
*Attorney, Agent, or Firm*—Cushman, Darby & Cushman IP Group of Pillsbury Madison & Sutro LLP

[57]  ABSTRACT

A hologram comprising a diffraction grating film with an interference fringe recorded thereon, a substrate provided on one side of said diffraction grating film, and cover plates provided on the surfaces of the aforesaid diffraction grating film by use of an adhesive, wherein the lateral face portion of the aforesaid hologram is covered with a water repellent layer, or a hologram comprising a diffraction grating film with an interference fringe recorded thereon and a substrate provided on one side of said diffraction grating film, the surface of the aforesaid diffraction grating film being covered with an adhesive, wherein the aforesaid adhesive contains an epoxy resin mixture consisting of an alicyclic epoxy and novolak type epoxy and an alicyclic acid anhydride type curing agent, a chief ingredient composed of an aromatic epoxy resin(s) and a curing agent comprising a mixture of an alicyclic amine and an aliphatic amine, or a chief ingredient composed of an aromatic epoxy resin(s) and a curing agent comprising a mixture of an alicyclic amine and an aromatic amine.

6 Claims, 12 Drawing Sheets

WAVELENGTH OF REPRODUCING LIGHT (nm)

HOLOGRAM

BACKGROUND OF THE INVENTION

1. Field of the Invention

The present invention relates to a hologram, whose diffraction grating film has a large area, and which is excellent in water resistance.

2. Description of the Related Art

A hologram is a device for causing incident light for an image to be displayed to diffract and reflect so as to obtain a reproduction light, and enabling a viewer to recognize the image to be displayed owing to said reproduction light.

This hologram is used for a head up display device 9, as illustrated in e.g. FIG. 19.

The aforesaid head up display device 9 is provided with an indicator 90 having a light source, a hologram 91 for diffracting and reflecting a light 30 emitted from the aforesaid indicator 90, and a windshield 92 for causing a diffracted light 31 emitted from said hologram 91 to reflect so as to enable a viewer 93 to recognize an image 94 to be displayed. Onto the aforesaid windshield 92, there is deposited a deposition film 921 for reflecting the aforesaid diffracted light 31.

The hologram 91 consists, as illustrated in FIG. 20, of a glass substrate 912 with a diffraction grating film 97 provided thereon, and cover plates 913 and 914 sandwiching said glass substrate 912 therebetween. The cover glass 913 improves the image quality, for it is made of reflection free coat glass or the like. In addition, the cover glass 914 imparts water resistance to the hologram 91.

The glass substrate 912 is sealed between the cover glass plates 913 and 914 through an adhesive 910. As illustrated in FIG. 20 and FIG. 21, a sealing width S is provided on the outer circumferential portion 20 of a diffraction grating film 910, and the diffraction grating film 97 is tightly sealed with the adhesive 910.

In the preparation of the aforesaid hologram, as illustrated in FIG. 20 and FIG. 21, the diffraction grating film 97 with an interference fringe recorded thereon is formed on the glass substrate 912. Subsequently, the outer circumference 20 of the diffraction grating film 97 is eliminated as the sealing width S. Subsequently, the adhesive 910 is coated on the outer circumferential portion of the diffraction grating film 97 and that of the glass substrate 912, and the cover glass plate 914 is adhered to the adhesive 910. In addition, an adhesive 910 is coated also on a surface of the glass substrate 912, opposite to the diffraction grating film 97, and the cover plate 913 is adhered thereto. The hologram 91 is thereby obtained.

In the aforesaid conventional hologram, it is indispensable to provide a sealing width S ranging from 3 to 8 mm on the outer circumferential portion 20 of the diffraction grating film 97, in order to protect the diffraction grating film against ambient humidity. Owing to this sealing width, the area of the diffraction grating film 97 becomes markedly smaller than that of the hologram. The display area for the image 94 to be displayed is thereby restricted.

To reduce the sealing width, improved adhesives are necessary, which can be costly and time consuming to use.

SUMMARY OF THE INVENTION

The subject of the present invention is, in consideration of such conventional problems as described above, to provide a hologram, which has a large area diffraction grating film and which is excellent in water resistance.

The first aspect of the present invention is to provide a hologram comprising a diffraction grating film with an interference fringe recorded thereon, a substrate provided on one side of said diffraction grating film, and cover plates provided on both surfaces of said diffraction grating film through an adhesive, wherein a water repellent layer is coated on the lateral face portion of the aforesaid hologram.

The second aspect of the present invention is to provide a hologram comprising a diffraction grating film with an interference fringe recorded thereon and a substrate provided on one side of said diffraction grating film, both surfaces of said diffraction grating film being coated with an adhesive, which contains an epoxy resin mixture consisting of an alicyclic epoxy and novolak epoxy and an alicyclic acid anhydride type curing agent.

The third aspect of the present invention is to provide a hologram comprising a diffraction grating film with an interference fringe recorded thereon and a substrate provided on one side of said diffraction grating film, both surfaces of said diffraction grating film being coated with an adhesive, which contains a chief ingredient composed of an aromatic epoxy resin and a curing agent comprising an alicyclic amine and aliphatic amine mixture.

The fourth aspect of the present invention, is to provide a hologram comprising a diffraction grating film with an interference fringe recorded thereon and a substrate provided on one side of said diffraction grating film, both surfaces of said diffraction grating film being coated with an adhesive, which adhesive contains a chief ingredient composed of an aromatic epoxy resin and a curing agent comprising an alicyclic amine and aromatic amine mixture.

DESCRIPTION OF THE PREFERRED EMBODIMENTS

Figure 1:
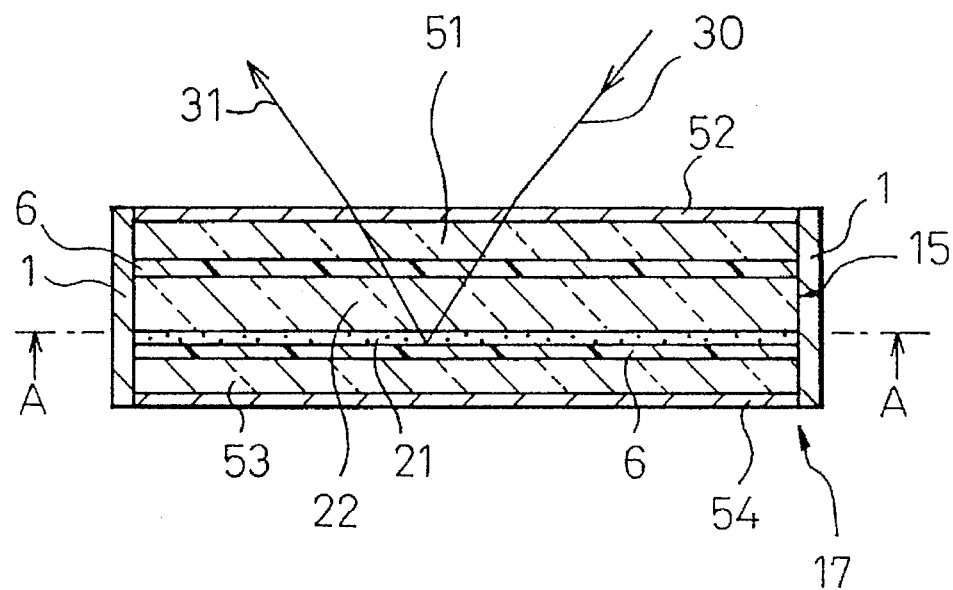
FIG. 1 is a sectional view of a hologram according to an embodiment of the present invention.

According to the first aspect of the present invention, the aforesaid water repellent layer is low in water permeability or water-repellent, and coats the lateral face portion of a hologram. There are no optical restrictions such as transparency, colors, and refractive index placed on the water repellant layer; therefore the material to be used can be selected from a wide range of materials.

For example, the water repellent layer can be composed of an epoxy resin, phenolic resin, butyral resin, acrylic resin, silicon resin, urethane resin, fluorine resin, and the like, and formed on the lateral face portion of a hologram by various methods, e.g. dipping, spraying, brushing, and the like.

The thickness of the aforesaid water repellent layer is preferably between 50 and 1000 μm, though it is not particularly limited. When the thickness of the water repellent layer is less than 50 μm, the water resistance of the hologram or the strength of the water repellent layer may decrease. On the other hand, when this thickness exceeds 1000 μm, it becomes difficult to achieve the purpose of the present invention.

Preferably, an additive such as wax or paraffin is added to the water repellant layer, to further improve the water repellency of the water repellent layer, and the water resistance of the hologram.

For example, a phenolic resin with a thickness ranging from 0.5 to 1 mm is impregnated with wax at a temperature ranging from 100° to 140° C. for a period of time ranging from 10 to 60 minutes. Thereby, a water repellent layer with a high water repellency is formed.

In addition, as the aforesaid water repellent layer, there can also be used a moisture resistance processing agent such as modified acryl, polyolefin, butyl-modified rubber, vinyl, and phloroacrylate. The above moisture resistance processing agents are generally used to impart water resistance to an IC substrate.

A moisture resistance processing agent can reduce the sealing width to approximately 3 mm, although it cannot be expected to impart as a high water repellency as a phenolic resin does.

A moisture resistance processing agent is used such that a liquid sealing agent is coated on the lateral face portion of a hologram so as to be air-dried. The thickness of the moisture resistance processing agent is preferably within the range between 10 and 500 μm. When this thickness is less than 10 μm, the water resistance of the hologram or the strength of the water repellent layer may decrease. On the other hand, when this thickness exceeds 500 μm, it becomes difficult to achieve the purpose of the present invention.

The aforesaid moisture resistance processing agent is preferably heated to a temperature of approximately 70° C. Thereby, the solvent in the moisture resistance processing agent is adhered more closely to the outer circumferential portion of the hologram.

As the adhesive adhering the aforesaid substrate and cover plates to each other, there can be used an ultraviolet-curing adhesive such as an acrylic adhesive, or a thermosetting adhesive such as an epoxy resin or a phenolic resin. Among these adhesives, an ultraviolet-curing adhesive is particularly preferably used. Thereby, the substrate and cover plates can be adhered to each other without heating the hologram.

An interference fringe is recorded on the aforesaid diffraction grating film. In order to record an interference fringe, for example, lights with different phases are made to be incident onto a sensitized film containing a sensitizing agent along two directions, whereby these luminous fluxes interfere with each other on the sensitized film. After the exposure, the diffraction grating film is developed by an ordinary process and tightly sealed by use of an adhesive and cover plates.

Specific examples of the material of the aforesaid substrate include glass, resin, and the like, and these materials can be used as a hard plates, flexible film or the like.

One or a plurality of cover plates can be used, which are adhered to one side or both sides of a substrate. For example, when one cover plate is provided on one side of a substrate, the hologram assumes a two-layer structure consisting of the substrate and cover plate. On the other hand, when a cover plate is provided on both sides of a substrate, the hologram assumes a three-layer structure consisting of the substrate and two cover plates. In addition, it is possible to provide a plurality of cover plates on both sides of a substrate.

The aforesaid cover plate can consist of glass, rein, metallic foil or the like.

In addition, the aforesaid adhesive can be processed for water repellence to form a water repellent layer. An example of such a hologram, is a comprises a diffraction gratig film with an interference fringe recorded thereon, a substrate with said diffraction grating film provided on one side thereof, and a water repellent layer coating the surface of the aforesaid diffraction grating film.

The aforesaid water repellent can consist of adding an additive such as wax and paraffin to the adhesive, to enhance the water repellence of the adhesive and the water resistance of the hologram.

Since only one substrate is used in the aforesaid hologram, the hologram can be produced as a thin product.

In the aforesaid present invention, since the lateral side portion of the hologram is coated with the water repellent layer, it is not necessary to provide a sealing width at the outer circumferential portion of the hologram. Accordingly, the diffraction grating film can be enlarged to include the lateral side portion of the hologram, whereby a large area diffraction grating film can be formed. Therefore, the display area for the display device can be enlarged to the area of the hologram, whereby a larger image can be displayed.

In addition, a water repellent layer is provided on the lateral face portion of the hologram, which prevents moisture from reaching the diffraction grating film and cover plates, and increases the water resistance.

In addition, the water repellent layer shows higher water resistance and water repellence than the adhesive. Allowing the water repellent layer to have a markedly reduced film thickness, as compared with the sealing width required for the adhesive.

In addition, the hologram is provided with a water repellent layer at the lateral face portion thereof, whatever number of substrates and cover plates may be used for forming the hologram. Therefore, moisture cannot reach the substrates or cover plates. Thereby, the hologram can be used for a long period of time.

In addition, by providing a water repellent layer on the lateral face portion of the hologram of the present invention, excellent water resistance can be achieved.

According to the present invention, it is possible to produce a hologram with a large area diffraction grating film, which is excellent in water resistance.

According to the second aspect of the present invention, the aforesaid adhesive consists of an epoxy resin mixture and an alicyclic acid anhydride type curing agent.

The epoxy resin mixture is a resin comprising an alicyclic epoxy and novolak type epoxy mixed.

Specific examples of the aforesaid alicyclic epoxy include a hydrogenated bisphenol A type epoxy represented by the following formula I, and the like.

Specific examples of epoxy include a novolak type epoxy include a phenol novolak epoxy represented by the following formula II, and the like.

When the compounding ratio of the curing agent is within the range of 40 to 60%, the water absorptivity of the adhesive can be improved.

In addition, preferable curing conditions of the adhesive, are 120° to 130° C. for 30 to 90 minutes.

Specific examples of the aforesaid diffraction grating film include e.g. gelatinous film.

Specific examples of the material of the aforesaid substrate include glass, resin and the like, and these materials can be used as a hard plate, flexible film or the like, respectively.

The aforesaid cover plates are used singly or as a plurality of plates, and adhered to one side or both sides of the substrate.

For example, when one cover plate is provided on one side of the substrate, the hologram assumes a two-layer structure consisting of the substrate and cover plate. On the other hand, when a plate is provided on both sides of the substrate, the hologram assumes a three-layer structure consisting of the substrate and two cover plates. It is also possible to provide a plurality of cover plates on each of both sides of the substrate.

Grass, resin, metallic foil, and the like can be used as the aforesaid cover plates.

In the adhesive of the present invention, the aforesaid alicyclic acid anhydride type curing agent shows lower water absorptivity than the aromatic polyamine which has been used for the adhesive according to the aforesaid conventional working example.

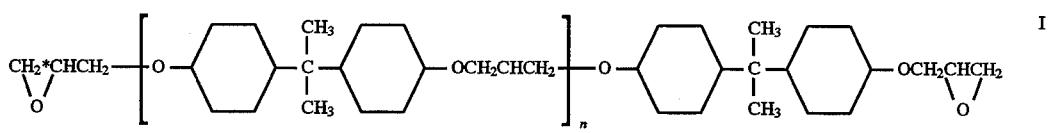

n = 1 to 16

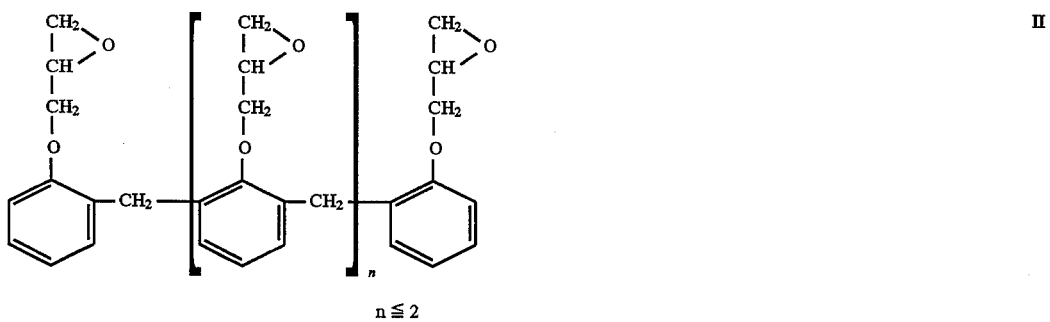

n ≦ 2

Specific examples of the aforesaid alicyclic acid anhydride type curing agent include tetrahydrophthalic anhydride and the like.

The compounding ratios of the aforesaid alicyclic epoxy, novolak type epoxy and the curing agent are preferably between 30 and 50% by weight (hereinafter "% by weight" will be referred to as only "%"), between 5 and 15%, and between 40 and 60%, respectively, based on 100% of the total amount of these three.

When the compounding ratio of the alicyclic epoxy is within the range of 30 to 50%, the refractive index of the adhesive can be made closest to that of the diffraction grating film.

When the compounding ratio of the novolak type epoxy is within the range of 5 to 15%, the heat resistance of the adhesive can be improved.

Accordingly, the hologram of the present invention can exhibit sufficient water resistance even when it is used at a high temperature and high humidity.

In addition, since the adhesive of the present invention is excellent in water resistance as described above, the sealing width for sealing the diffraction grating film which has hitherto been required can be reduced, so that the area of the diffraction grating film can be enlarged by the thus reduced sealing width.

In addition, the aforesaid alicyclic epoxy and alicyclic acid anhydride type curing agents are composed of an alicyclic compound more stable than an aromatic compound. Therefore, even when ultraviolet rays irradiate the hologram, the bonds in the adhesive are not broken. Accordingly, the hologram of the present invention can be used for a long period of time without any deterioration in the characteristics of the hologram, even in the open air, or when exposed to sunlight.

In addition, any of alicyclic epoxy, novolak type epoxy, and alicyclic acid anhydride type curing agents show low skin irritativeness. Therefore, the workability of a hologram being produced and handled can be sharply improved.

As the aforesaid aromatic epoxy resin, there are used one or more selected from the group consisting of e.g. bisphenol A type epoxy represented by the following formula III, flexible epoxy represented by the following formula IV, and strain-molecular weight-adjusting epoxy represented by the following formula V.

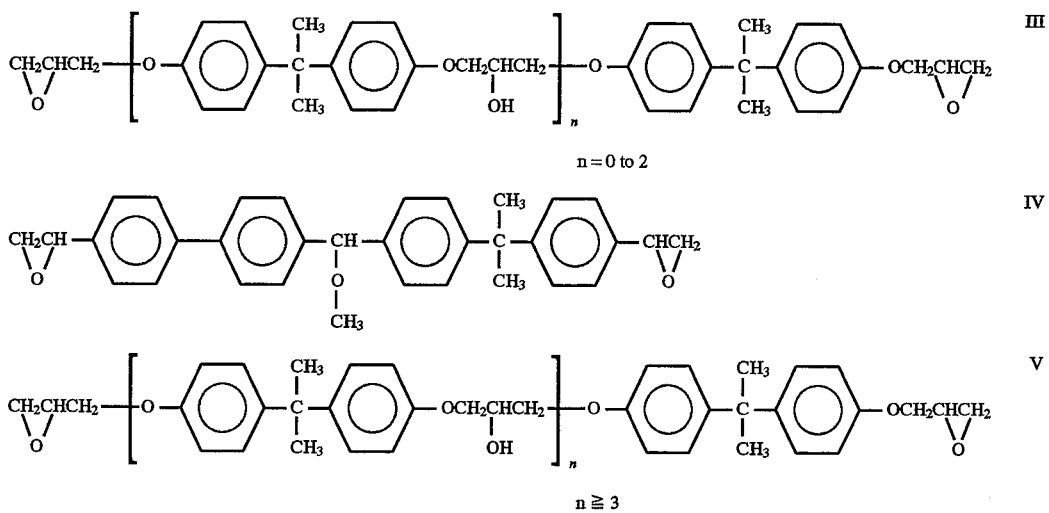

In addition, by changing the aforesaid compounding ratios, the refractive index of the adhesive can be adjusted. That is, the alicyclic epoxy is an alicyclic compound, whose refractive index is lower than the index of an aromatic compound. Therefore, when the compounding ratio of the aforesaid alicyclic epoxy is increased, the refractive index of the adhesive can be reduced. On the contrary, when the compounding ratio of the alicyclic epoxy is reduced, the refractive index of the adhesive can be increased. Accordingly, by adjusting the compounding ratio of the alicyclic epoxy, the refractive index of the adhesive can be made to approximate to the refractive index of the diffraction grating film. Therefore, the hologram of the present invention can reproduce a clear displayed image with a low noise ratio.

In addition, the aforesaid novolak type epoxy enhances the cross linking density of the adhesive, and improves the heat resistance thereof. Therefore, a hologram using this adhesive is amenable to various production conditions and use conditions.

In addition, the aforesaid adhesive of the present invention can be utilized not only for a conventional glass structure but also for a simple structure such as a two-glass plate structure or a glass-metallic foil structure, and it is needless to say that the present adhesive can be utilized for an adhesive of a film structure, which is a possible future use of this adhesive.

The present invention can provide a hologram which is excellent in water resistance and ultraviolet resistance, and low in irritativeness to the skin, and which can clearly reproduce a displayed image.

In the third aspect of the present invention, the aforesaid adhesive is composed of a chief ingredient composed of an aromatic epoxy resin and a curing agent comprising an alicyclic amine and aliphatic amine mixed.

The aforesaid aromatic epoxy resin is preferably an aromatic epoxy resin comprising two or more aromatic epoxy resins mixed.

In addition, the aforesaid aromatic epoxy resin is preferably composed of a mixture of the aforesaid three kinds of epoxies.

The bisphenol A type epoxy is a main epoxy, which can improve the moisture resistance of the adhesive. The flexible epoxy can reduce the internal stress of the adhesive. The strain-molecular weight-adjusting epoxy reduces the contraction stress of the adhesive when it is cured, and adjusts the strain and molecular weight of the adhesive.

The aforesaid aromatic epoxy resin mixture is composed preferably of 30 to 40% of a bisphenol A type epoxy, 20 to 30% of a flexible epoxy, and 20 to 40% of a strain molecular-weight-adjusting epoxy.

When the proportion of the bisphenol A type epoxy is less than 30%, the cross linking density of the aromatic epoxy resin mixture may decrease and the water permeability through the resin may increase. On the other hand, when the proportional amount of the bisphenol A type epoxy exceeds 40%, the resin may become stiffened, stress may develop on the adhesion boundary surface, and that the resin may peel off.

When the proportion of the flexible epoxy is less than 20%, the resin may become stiffened, stress may develop on the adhesion boundary surface, and the resin may peel off. On the other hand, when the proportion of the flexible epoxy exceeds 30%, the cross linking density of the aromatic epoxy resin mixture may decrease and the water permeability of the resin may increase.

When the proportion of the strain-molecular weight-adjusting epoxy is amount less than 20%, the molecular weight and arrangement of the resin may become heterogeneous and the resins properties may be inadequate not be obtained. On the other hand, when the proportion of the strain-molecular weight-adjusting epoxy exceeds 40%, the cross linking density of the aromatic epoxy resin mixture may decrease and the water permeability of the resin may increase.

In addition to the chief ingredient, composed of the aforesaid aromatic epoxy resin, an additive composed of a reactive diluent or/and an adhesiveness-imparting agent is preferably added. Specific examples of the aforesaid reactive diluent include e.g. diglycidyl ethers represented by the following formula VI, and the like. Specific examples of the aforesaid adhesiveness-imparting agent include e.g. a silane coupling agent represented by the following formula VII, and the like.

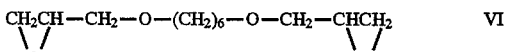

VI

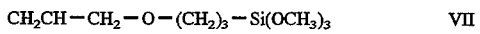

VII

The aforesaid additive is contained in the aforesaid chief ingredient in a proportion of 10% or less. When the proportion of the additive exceeds 10%, the unreacted silane coupling agent may remain in the boundary surface and the sealing property of the adhesive on the boundary surface may deteriorate.

The aforesaid curing agent is an amine mixture comprising an alicyclic amine and an aliphatic amine. Specific examples of the aforesaid curing agent include an adductized compound represented by the formula VIII, and the like. In addition, specific examples of the aforesaid aliphatic amine include e.g. a denatured modified aliphatic amine represented by the formula IX, and the like.

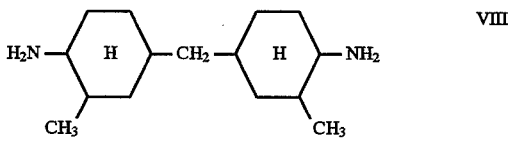

VIII

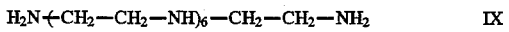

IX

The term, "adductized compound" herein referred to means a compound obtained by partially reacting an alicyclic amine so as to add an alkyl group and the like to the alicyclic amine. In addition, the "denatured modified aliphatic amine" herein referred to means an aliphatic amine whose properties are changed by partial reaction, mixing or the like of the aliphatic amine.

Herein, when a mixture of an adductized compound of an alicyclic amine and a modified aliphatic amine is used as the aforesaid curing agent, as the mixing ratios of both the substances, that of the adductized compound of the alicyclic amine is preferably between 50 and 70%, and that of the modified aliphatic amine is preferably between 30 and 50%. When the proportion of the aforesaid adductized compound of the alicyclic amine is less than 50%, the heat resistance of the adhesive may decrease and its properties may deteriorate at high temperatures. On the other hand, when the proportional of this compound exceeds 70%, the resin may become stiffened, stress may develop, and peeling may occur.

When the proportion of the aforesaid modified aliphatic amine is less than 30%, the resin may become stiffened, stress may develop, and peeling may occur. On the other hand, when this proportion exceeds 50%, the heat resistance of the adhesive may decrease and its properties may deteriorate at high temperatures.

In addition, the mixing ratios of the adductized compound of an alicyclic amine and the modified aliphatic amine are preferably approximately 60% and 40%, respectively, in order to optimize the properties of the curing agent.

The amount of the aforesaid additive to be added to the chief ingredient of the aforesaid curing agent is set preferably within the range between 20 to 50% by weight. When the amount of the additive is within this range, it is possible to improve the water absorptivity of the adhesive and improve the ultraviolet resistance thereof. When the proportion of the aforesaid additive is less than 20% by weight, the excess chief ingredient may remain in the cured substance, resulting in increased water permeability of the adhesive. On the other hand, when the above proportion exceeds 50% by weight, the excess chief ingredient may remain in the cured product, resulting in increased water permeability of the adhesive.

In addition, the curing conditions for the aforesaid adhesive are preferably at 100° to 120° C. for 45 to 120 minutes. When the curing temperature is less than 100° C., the adhesive may not be sufficiently cured. On the other hand, when the curing temperature exceeds 120° C., the diffraction grating film or substrate, adhered by use of the adhesive, may be modified.

In addition, when the curing period is less than 45 minutes, the adhesive may not be sufficiently cured. On the other hand, when the curing period exceeds 120 minutes, the diffraction grating film or substrate, adhered by use of the adhesive, may be modified.

Specific examples of the aforesaid diffraction grating film include e.g. a gelatin film.

Specific examples of the material of the aforesaid substrate include glass, resins and the like, and these materials can be used as hard plates or flexible films.

The aforesaid cover plates can be used one or more at a time, and adhered to one side or both sides of the substrate.

For example, when one cover plate is provided on one side of the substrate, the hologram assumes a two-layer structure consisting of the substrate and cover plate. In addition, when a cover plate is provided on each side of the substrate, the hologram assumes a three-layer structure consisting of the substrate and two cover plates. It is also possible to provide a plurality of cover plates, with one or more on both sides of the substrate.

The aforesaid cover plates, can consist of glass, resin, metallic foil or the like.

In the present invention, the aforesaid adhesive consists of a chief ingredient composed of an aromatic epoxy resin and a curing agent comprising a mixture of an alicyclic amine and aromatic amine.

Specific examples of the aforesaid alicyclic amine include e.g., an alicyclic amine represented by the following formula XI.

As the aforesaid aromatic amine, a modified aromatic amine or/and an adductized aromatic amine can be used. Specific examples of the modified and adductized aromatic amine include e.g. a modified and adductized aromatic amine represented by the following formula X.

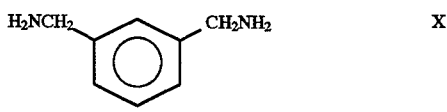

X

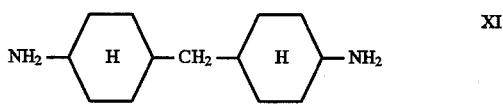

XI

The "adductized aromatic amine" herein referred to means an aromatic amine obtained by partial reaction of an aromatic amine so as to add an alkyl group or the like to the aromatic amine. In addition, "the modified aromatic amine"

also herein referred means an aromatic amine whose properties are modified by partial reaction, mixing, or the like of the aromatic amine.

For example, when a mixture of an alicyclic amine and an adductized compound of a modified aromatic amine is used as the aforesaid adhesive, as the mixing ratios of both substances, the proportion of the alicyclic amine is preferably between 50 and 70%, and that of the adductized compound of a modified aromatic amine is preferably between 30 and 50%.

When the proportion of the aforesaid alicyclic amine is less than 50%, the heat resistance of the adhesive may decrease, and its properties at high temperatures may deteriorate. On the other hand, when the proportion of the alicylcic amine exceeds 70%, the resin may become stiffened, stress may develop on the adhered surfaces, and peeling may occur.

When the proportion of the aforesaid adductized compound of the modified aromatic amine is less than 30%, the resin may become stiffened, stress may develop on the adhered boundary surfaces, and peeling may occur. On the other hand, when the proportion of the adductized compound exceeds 30%, the heat resistance of the adhesive may decrease, and its properties at high temperatures may deteriorate.

In addition, the mixing ratios between the alicyclic amine and modified aromatic amine are preferably approximately 60% and 40%, respectively, in order to optimize the properties of the curing agent.

The other details are the same as in the aforesaid first invention.

In the first invention according to the present application, a curing agent consisting of the aforesaid alicyclic amine and aliphatic amine is used. An adhesive containing this curing agent is lower in water absorptivity than the aforesaid conventional aromatic polyamine.

Therefore, the hologram of the present invention exhibits sufficient durability even when used at high temperatures and high humidity.

In addition, since the adhesive of the present invention is excellent in water resistance as mentioned above, the sealing width for sealing a diffraction grating film which has hitherto been required, can be reduced to a great extent, so that the area of the diffraction grating film can be enlarged by the thus reduced sealing width.

In addition, the curing agent is composed of a more inert compound than the conventional aromatic amine curing agent, and contained in the adhesive in a greater quantity. Therefore, although the chief ingredient contains a benzene ring with the usual degree of reactivity, the proportion of benzene rings in the adhesive is reduced.

Therefore, even when the adhesive is irradiated with ultraviolet rays, the ultraviolet rays are only slightly absorbed by the adhesive, and the bonds in the adhesive are not severed. Accordingly, the hologram of the present invention can be used for a long period of time without any change in the characteristics of the hologram, even in strong sunlight.

In addition, not only the aromatic epoxy resin constituting the chief ingredient but also the curing agent consisting of an alicyclic amine and aliphatic amine show low irritativeness to the skin. Accordingly, the workability in the case of the hologram being produced or handled can be markedly improved.

In addition, by changing the compounding ratios between the chief ingredient and curing agent, the refractive index of the adhesive can be adjusted.

That is, since the curing agent contains no benzene ring or contains only a small amount of benzene rings, the refractive index of the curing agent is low. Therefore, when the compounding ratio of the aforesaid curing agent is increased, the refractive index of the adhesive can be reduced. Conversely, when the compounding ratio of the aforesaid curing agent is reduced, the refractive index of the adhesive can be increased. Accordingly, by controlling the compounding ratio of the curing agent, the refractive index of the adhesive can be made to approximate to the refractive index of the diffraction grating film. Therefore, the hologram of the present invention can reproduce a distinct displayed image with a low noise ratio.

In addition, the adhesive of the present invention can be utilized not only for the conventional glass structure, but also a simple structure such as a two-glass plate structure or a glass-metallic foil structure, and it is needless to say that the present adhesive can be utilized as an adhesive for a film structure which is one of the structures expected to be adopted in the future.

In addition, for the diffraction grating film, there can be used another sensitizing agent such as a photopolymer and photoresist. In this case, since the moisture resistance of the photopolymer itself is excellent, the sealing width at the outer circumferential portion of the hologram can be made almost zero. In addition, a hologram excellent in ultraviolet resistance can be produced simply.

In addition, in the second invention according to the present application, a curing agent consisting of the aforesaid alicyclic amine and aromatic amine is used. An adhesive containing the above curing agent is low in water absorptivity, excellent in durability, and low in irritativeness to the skin.

As described above, the present invention can provide a hologram excellent in water resistance and ultraviolet resistance, which is low in irritativeness to the skin, thereby increasing its workability, and which can clearly reproduce a displayed image.

In the following, the hologram according to the present invention will be further explained with reference to working examples.

EXAMPLE 1

Figure 2:
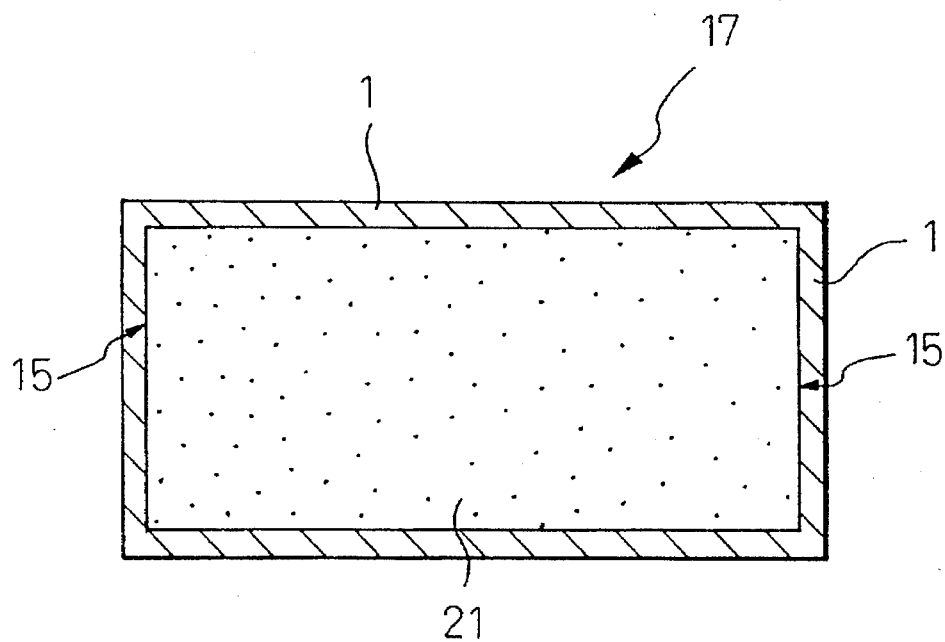
FIG. 2 is a sectional view taken along the line A—A in FIG. 1.

A hologram 17 in the present working example has a diffraction grating film 21 with a recorded interference fringe and a glass substrate 22 provided on one side of the diffraction grating film 21, as illustrated in FIG. 1 and FIG. 2. On the surfaces of the diffraction grating film 21, there are provided cover plates 51 and 53 through adhesives 6.

The lateral face portion 15 of the hologram 17, is provided with a water repellent layer 1. The water repellent layer 1 is low in water permeability or is water repellant.

The water repellent layer 1 is prepared by impregnating a phenolic resin with a thickness ranging from 0.5 to 1 mm with a wax.

The adhesive 6 adhering the cover plates 51 and 53 and the glass substrate 22 to each other, is an epoxy type thermosetting resin. The refractive index of the adhesive 6 is 1.55.

The diffraction grating film 21 is a gelatin bichromate film with a recorded interference fringe recorded and has a thickness ranging from 10 μm to 40 μm.

The glass substrate 22 is made of transparent soda glass, and has a dimension of 112 mm×46 mm×18 mm. The refractive index of the glass substrate 22 is 1.52.

The cover plates 51 and 53 are made of transparent soda glass, and have dimensions of 112 mm×46 mm×1.0 mm. The refractive indices of these cover plates is 1.52. On the surface facing the atmosphere of the cover plate 51, there is a reflection reducing film 52 comprising alternately laminated $MgF_2$ and $TiO_2$. In addition on the surface facing the atmosphere of the cover plate 53, there is an antiscattering film 54 comprising an epoxy resin mixed with a black pigment.

The adhesive 6 is made of an epoxy resin thermosetting resin (trade name "CS-2340-5" produced by Cemedyne Inc.), and its refractive index is 1.55. The thickness of the adhesive 6 is 50 µm in every portion.

The aforesaid hologram 17 causes a light 30 incident from the side of the reflection reducing film 52 to diffract-reflect, whereby an image to be displayed, caught by the diffracted light 31, can be recognized by a viewer.

In the following, a process for the production of the aforesaid hologram 17 will be explained.

First, 0.6 g of ammonium bichromate is dissolved in 100 ml of a 4% solution of gelatin, so as to prepare a solution of gelatin bichromate as a sensitizing agent. The refractive index of the solution of gelatin bichromate is 1.55.

Subsequently, the aforesaid solution of gelatin bichromate is coated on a surface of a glass substrate in a film thickness ranging from 10 to 40 µm, and after the thus coated solution of gelatin bichromate has been gelled or dried, it is allowed to stand for 72 hours in an atmosphere at approximately 20° C. and 50% RH, to stabilize. Thereby, a sensitized film composed of gelatin is formed on the surface of the glass substrate.

Figure 3:
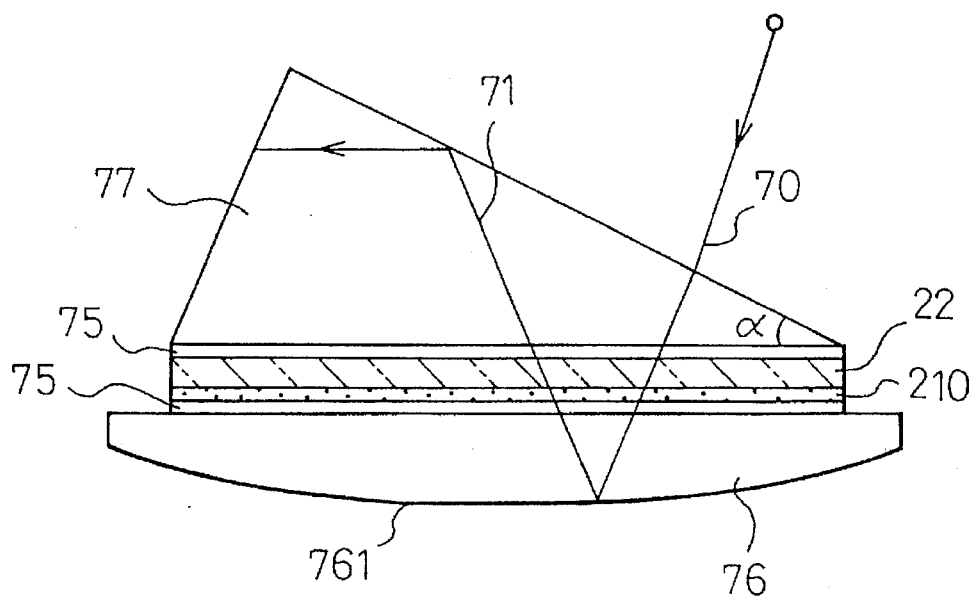
FIG. 3 is an explanatory view illustrating how to record an interference fringe on a diffraction grating film.

Subsequently, as illustrated in FIG. 3, the glass substrate 22 with the aforesaid sensitized film 210 formed thereon is interposed between a convex lens 76 with a focal length of 1000 mm and a prism 77, a refractive index-adjusting liquid 75 being interposed therebetween. As the refractive index-adjusting liquid, silicone oil was used.

Subsequently, as illustrated in FIG. 3, an argon laser beam with a wavelength of 514.5 nm is positioned so that its angle of incidence is such that the reproducing light may have two colors at wavelengths of 540 nm and 600 nm (at an angle of incidence of 33.5°), and a laser beam with a total power of 500 mJ is used as an incident light 70 from the side of the prism 77. Since the refractive index of the prism 77 and that of the convex lens are uniform, the incident light 70 goes forward rectilinearly toward the convex lens 76 and is reflected by a reflection film 761 formed on the surface, facing the atmosphere, of the convex lens 76. The thus reflected light 71 passes again through the sensitized film 210. In this case, the incident light 70 and reflected light 71 interfere with each other on the sensitized film 210, so that an interference fringe is recorded on the sensitized film 210.

A part of the reflected light 71 passes through the refractive index-adjusting liquid 75 and glass substrate 22 without being reflected by the glass substrate, is incident into the prism 77, and partly reflected on the incident surface of said prism 77. In this case, it suffices if the angle α of the incident surface of the prism 77 is adjusted for the incident light 70, so as to prevent the reflected light 77 on the incident surface of the prism 77 from going forward toward the sensitized film 210, as illustrated in FIG. 3. In the present working example, the angle of incidence α was set to 30°. As described above, by arrangement of the prism 77, display noise caused by the reflected light on the boundary surfaces, which produces noise, can be eliminated.

In addition, by applying a black coating to the lateral face of the prism 77, it is possible to prevent the reflected light on the incident surface of the prism 77 from going forward toward the sensitized film 210.

Thereby, an interference fringe is recorded on the aforesaid sensitized film 210.

After the assembly illustrated in FIG. 3 had been exposed, it was washed with water until the aforesaid glass substrate 22 was decolored, and steeped in a commercially available photographic hardening fixer ("Rapid Fixer" produced by Kodak Inc.) for 10 minutes. After the assembly had been washed with water, it was steeped in a 90% isopropyl alcohol solution and then in a 100% isopropyl alcohol solution for 10 minutes, respectively, whereafter the assembly was hot-air dried. Subsequently, the assembly was hot-aged for 4 hours at a temperature of 150° C., so as to prevent changes in the wavelength under use environment. Thereby, on one side of the glass substrate 22, there is formed a diffraction grating film 21 with an interference fringe recorded therein.

Figure 5:
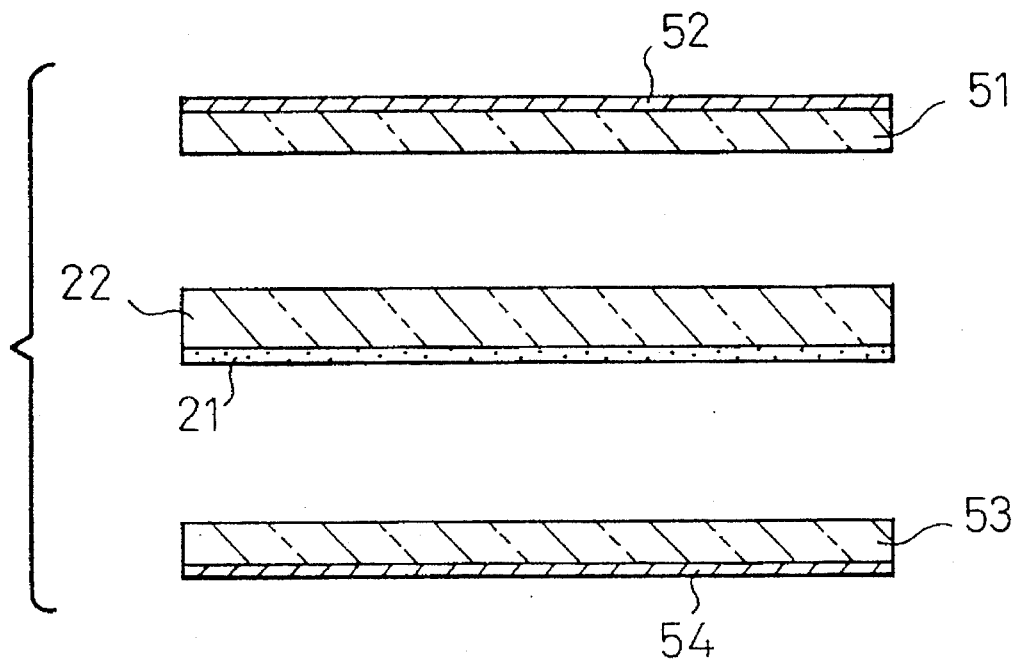
FIG. 5 is an explanatory view illustrating how the glass substrate and cover plates according to the embodiment in FIG. 1 are arranged.

Subsequently, as illustrated in FIG. 5, there is prepared a cover plate (112 mm×46 mm×1.0 mm) with an antiscattering film 54 with a thickness of 10 µm formed on the surface thereof. The antiscattering film 54 comprises a black pigment added to an epoxy resin in a proportion of 5% ("Glass Light 500" produced by Caschew).

On the other hand, as illustrated in FIG. 5, there is prepared a cover plate 51 (112 mm×46 mm×1.0 mm) with an antiscattering film 52 formed on the surface. The antiscattering film 52 assumes a structure such that $MgF_2$ and $TiO_2$ are alternately laminated in four layers, and the visual reflectance of the antiscattering film 52 is 0.3%.

The visual reflectance was obtained according to the following equation:

$$Y\% = 100 \int_{400}^{750} S(\lambda)R(\lambda)y(\lambda)d\lambda / \int_{400}^{750} y(\lambda)d\lambda$$

In the above equation, Y% denotes the visual reflectance, λ denotes the wavelength (10 nm step) of a light, S(λ)=1 (flat light source), R(λ) denotes a spectral reflection spectrum, and y(λ) denotes a color matching function of 193 ICIE.

In a head up display structure (see FIG. 19), the noise image luminance was measured (the display distance was 1.9 m), letting the standard image luminance be 3000 cd/m², whereby a noise ratio (see the following description) was obtained. In addition, the hologram characteristic at this time was illustrated in FIG. 4.

noise ratio = noise image luminance × 100/standard image luminance(%)

Subsequently, the adhesive 6 is coated on the surfaces of the aforesaid cover plates 51 and 53 in a thickness of 50 µm, respectively.

Figure 6:
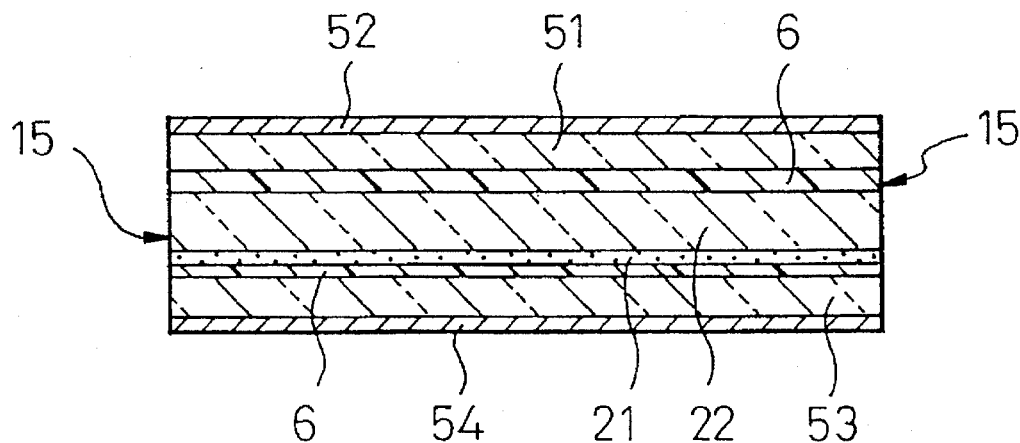
FIG. 6 is an explanatory view illustrating how the glass substrate and cover plates according to the embodiment in FIG. 1 are laminated.

Subsequently, these two cover plates 51 and 53 were arranged for the glass substrate 22, as illustrated in FIG. 5, and the glass substrate 22 was sandwiched between these two cover plates 51 and 53 through the adhesive 6, so as to obtain a hologram as illustrated in FIG. 6.

Thereafter, on the lateral face portion 15 of the hologram, there is coated a phenolic resin as a water repellent layer in a thickness ranging from 0.5 to 1 mm, and the hologram is impregnated with a wax as an impregnant at a temperature ranging from 100° to 140° C., for a period of time ranging from 10 to 60 minutes. Thereby, there is obtained a hologram 17 with the high water repellency water repellent layer 1 formed thereon.

In the following, the function and effect of the present invention will be explained.

In the hologram 17 of the present working example, although no sealing width was provided on the outer circumferential portion of the hologram, the reproduction light wavelength was hardly changed for a long period of time of 1000 hours under the use conditions of 65° C. and 95% RH, and sufficient reliability for use was obtained.

In addition, as illustrated in FIG. 1 and FIG. 2, ambient moisture did not penetrate the diffraction grating film 21 and cover plates 51 and 53, so that the hologram exhibited sufficient water resistance.

In addition, since the water repellent layer 1 is provided at the lateral face portion 15 of the hologram 17, the diffraction grating film 21 can be enlarged to the lateral face portion 15 of the hologram 17, whereby a large area diffraction grating film 21 can be formed. Therefore, a larger display image can be reproduced and displayed.

In addition, the water repellent layer 1 is higher than the adhesive 6 in water resistance and water repellency. Therefore, the water repellent layer 1 can have a markedly lower film thickness than the sealing width which has been required for the adhesive 6.

Further, by performing a simple treatment of providing the water repellent layer 1 on the lateral face portion 15 of the hologram 17, the hologram exhibits excellent water resistance.

Although the present working example used cover plates 51 and 53 with the reflection reducing film 52 and antiscattering film 54 preliminarily formed thereon, it is possible to seal the glass substrate 22 with the diffraction grating film 21 formed or to form the water repellent layer 1, and thereafter apply the aforesaid reflection reducing film 52 or/and antiscattering film 54.

In addition, in the hologram 17 of the present invention, noise was low and the displayed image was clear not only at the time of reproduction but at the time of recording.

EXAMPLE 2

Figure 7:
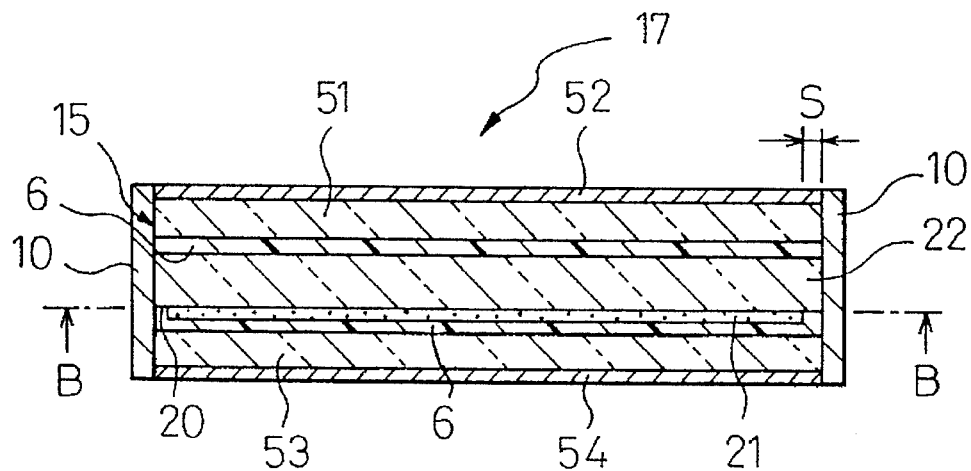
FIG. 7 is a sectional view of a hologram according to another embodiment of the present invention.
Figure 8:
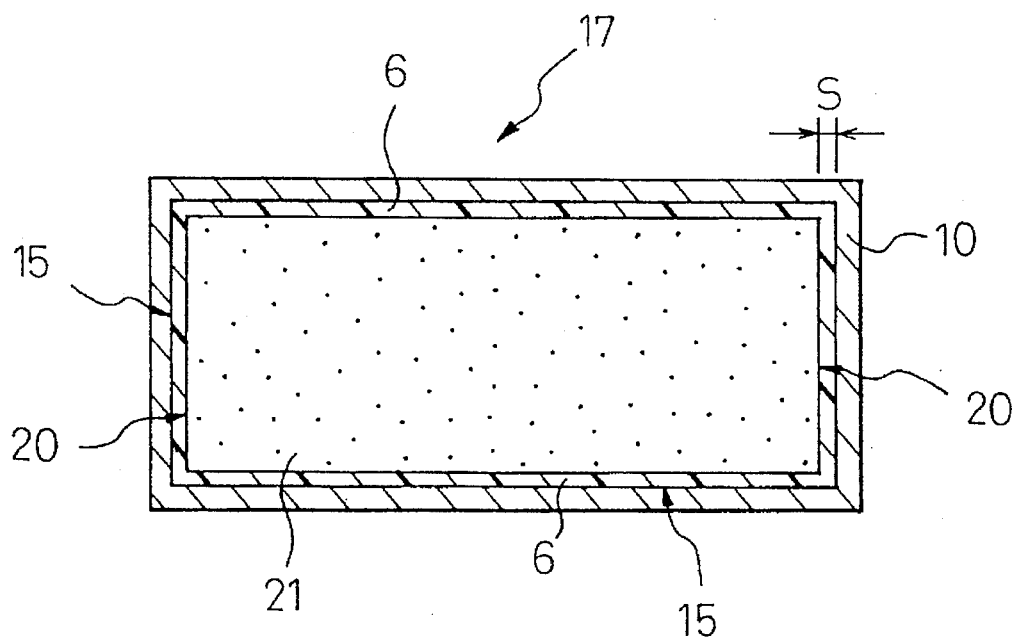
FIG. 8 is a sectional view taken along the line B—B in FIG. 7.

The present working example, as illustrated in FIG. 7 and FIG. 8, uses a moisture resistance processing agent for the water repellent layer 10. The moisture resistance processing agent does not provide as much water repellency as the phenolic resin, but the sealing width S at the outer circumferential portion 20 of the hologram can be reduced by approximately 3 mm, as compared with the conventional hologram.

The moisture resistance processing agent is used by coating a liquid moisture resistance processing agent on the lateral face portion of the hologram and air-drying. The thickness of the moisture resistance processing agent is between 10 and 500 μm.

The other details are the same as in Example 1. Also the present working example, can provide the same effect as obtained in Example 1.

EXAMPLE 3

Figure 9:
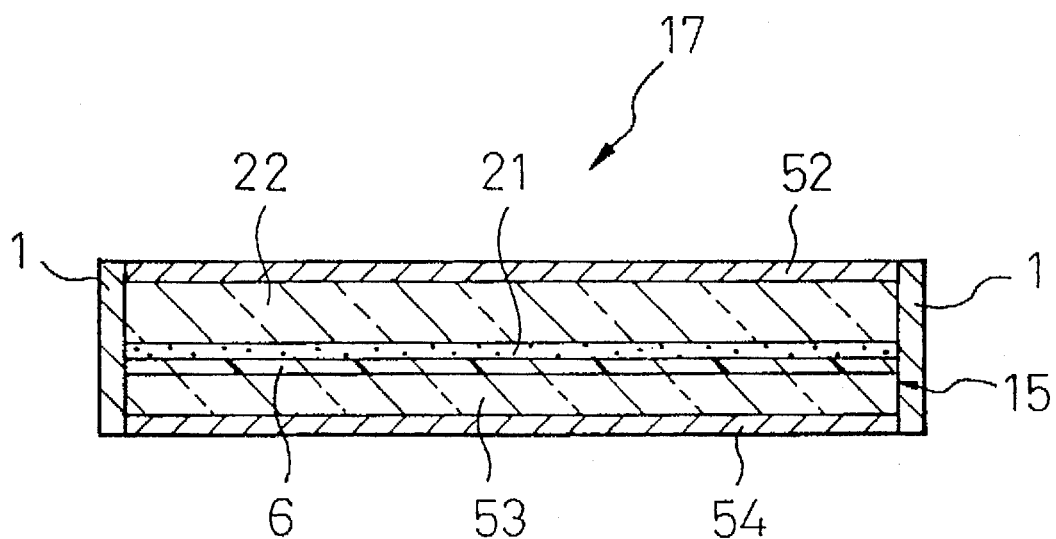
FIG. 9 is a sectional view of a hologram according to another embodiment of the present invention.

In the hologram of the present working example, as illustrated in FIG. 9, only the surface facing a diffraction grating film 21, of a glass substrate 22 is covered with a cover plate 53. On the surface, facing the atmosphere, of the glass substrate 22 there is formed a reflection reducing film 52. In addition, on the surface, facing the atmosphere, of the cover plate 53 there is formed an antiscattering film 54.

The other details are the same as in Example 1.

The hologram of the present working example assumes a two-layer structure consisting of one cover plate 53 and the glass substrate 22. Accordingly, the thickness of the hologram 17 can be decreased. The other details are the same as in Example 1.

EXAMPLE 4

Figure 10:
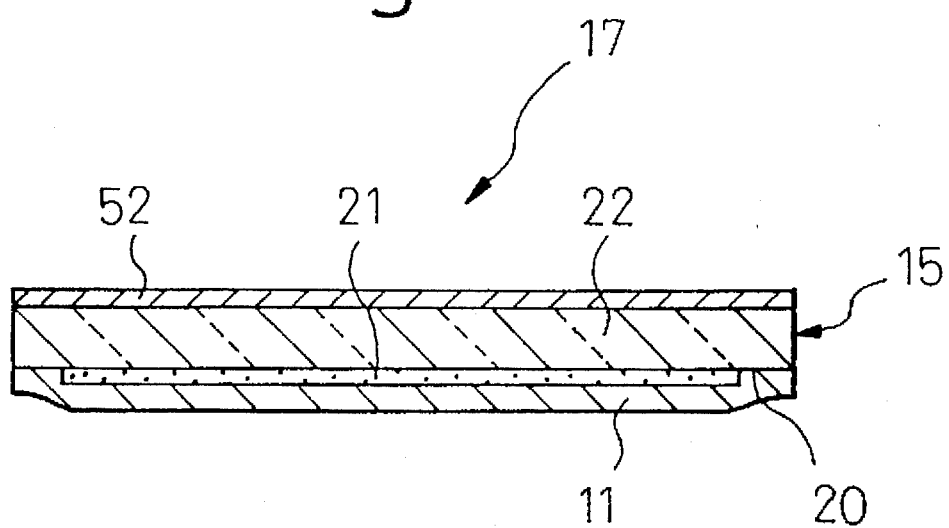
FIG. 10 is a sectional view of a hologram according to another embodiment of the present invention.

The hologram of the present working example assumes a one-layer structure composed of a glass substrate 22, without using a cover plate, as illustrated in FIG. 10. On one side of the glass substrate 22, there is formed a diffraction grating film 21 with a recorded interference fringe. The whole of the surface of the diffraction grating film 21 is coated with a water repellent layer 11. On the surface of the glass substrate 22 opposite to the diffraction grating film 21, there is formed a reflection reducing film 52.

The aforesaid water repellent layer 11 is obtained by impregnating a phenolic resin as an adhesive with a wax as an impregnant. Thereby, the water repellency of the adhesive can be enhanced and the water resistance of the hologram can be improved.

In addition, it is preferable to mix carbon black in the water repellent layer 11, so as to cause the water repellent layer to assume a black color. By treating the water repellent layer as described above, the same function as that of the aforesaid antiscattering film can be imparted to the water repellent layer 11 of the present working example.

In the hologram 17 of the present working example, there is used only one substrate. Therefore, the thickness of the hologram 17 can be made small.

EXAMPLE 5

Figure 11:
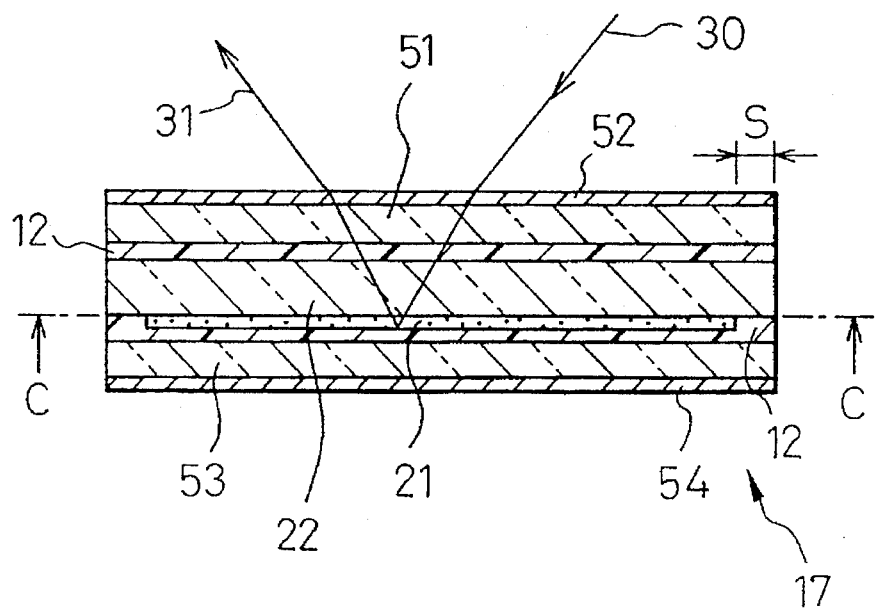
FIG. 11 is a sectional view of a hologram according to another embodiment of the present invention.
Figure 12:
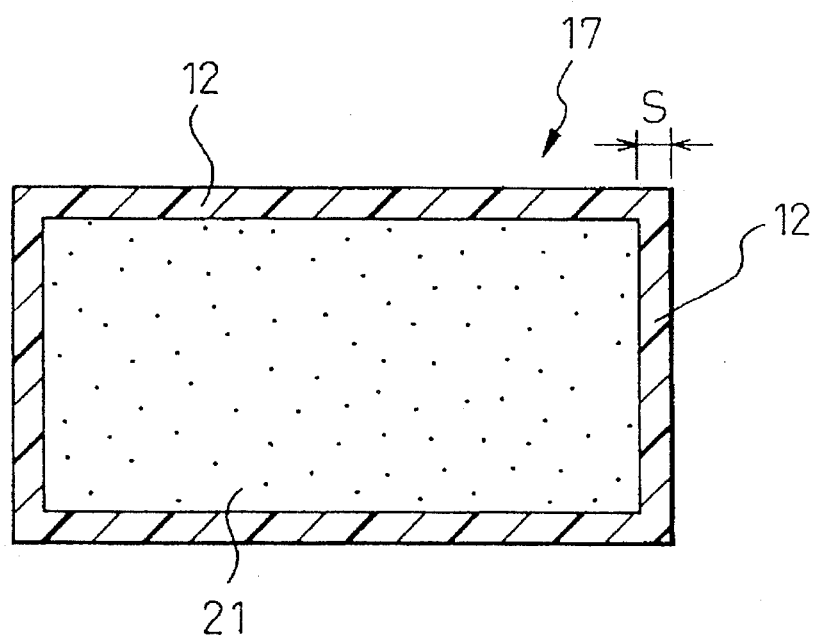
FIG. 12 is a sectional view taken along the line C—C in FIG. 11.

A hologram 17 of the present working example is provided with a diffraction grating film 21 with an interference fringe recorded thereon and a glass substrate 22 provided on one side of the diffraction grating film 21, as illustrated in FIG. 11 and FIG. 12. Both surfaces of the diffraction grating film 21 are provided with cover plates 51 and 53 bound by an adhesive 12.

The aforesaid adhesive 12, adhering the glass substrate 22 to the diffraction grating film 21 provided thereon and cover plates 51 and 53 to each other, is composed of an epoxy resin mixture and an alicyclic acid anhydride type curing agent.

The epoxy resin mixture is a resin comprising an alicyclic epoxy and novolak type epoxy mixed.

A hydrogenated disphenol A represented by the formula I, was used as the aforesaid alicyclic epoxy in the present working example.

A phenol novolak epoxy represented by the formula II was used as the aforesaid novolak type epoxy.

Tetrahydrophthalic anhydride was used as the aforesaid alicyclic acid anhydride curing agent.

In the aforesaid adhesive, the proportion of the alicyclic epoxy is 39%, that of the novolak type epoxy is 10%, that of the alicyclic acid anhydride curing agent is 49%, and that of an imidazole derivative is 1%, and various additives are contained in extremely small amounts, respectively.

The refractive index of the adhesive of the present working example is 1.52.

The toxicity and physical properties of the aforesaid adhesive are set forth in Table 1.

TABLE 1

| Ingredients Names (chemical names) | Weight (%) | LD 50 (g/kg) | Toxicity Skin Irritativeness (SPI · %) | Density (%) | Physical Properties Boiling Point (°C) | Flash Point (°C) |
|---|---|---|---|---|---|---|
| alicyclic epoxy | 39 | 3.9 | 3 | 1.17 | 204 | 198 |
| novolak type epoxy | 10 | 5 | 3 | — | — | 302 |
| alicyclic acid anhydride II | 49 | 3 | 3 | 1.20 | 121 | 155 |
| imidazole derivative | 1 | 0.88 | 3 | — | — | 185 |
| Additive A | extremely small amount | — | — | 1.07 | 290 | 135 |
| Additive B | extremely small amount | 7 mg | — | — | 200 | — |
| Additive C | extremely small amount | — | — | 1.05 | 265 | 126 |

The diffraction grating film 21 is a gelatin bichromate film with an interference fringe recorded thereon, and has a thickness ranging from 10 μm to 40 μm.

The glass substrate 22 is made of transparent soda glass, and measures 112 mm×46 mm×18 mm. The refractive index of the glass substrate 22 is 1.52.

The aforesaid hologram 17 causes a light 30 incident from the reflection reducing film 52 side to diffract and reflect, whereby an image to be displayed, which is caught by the reflected light 31, can be visually recognized by a viewer.

Figure 19:
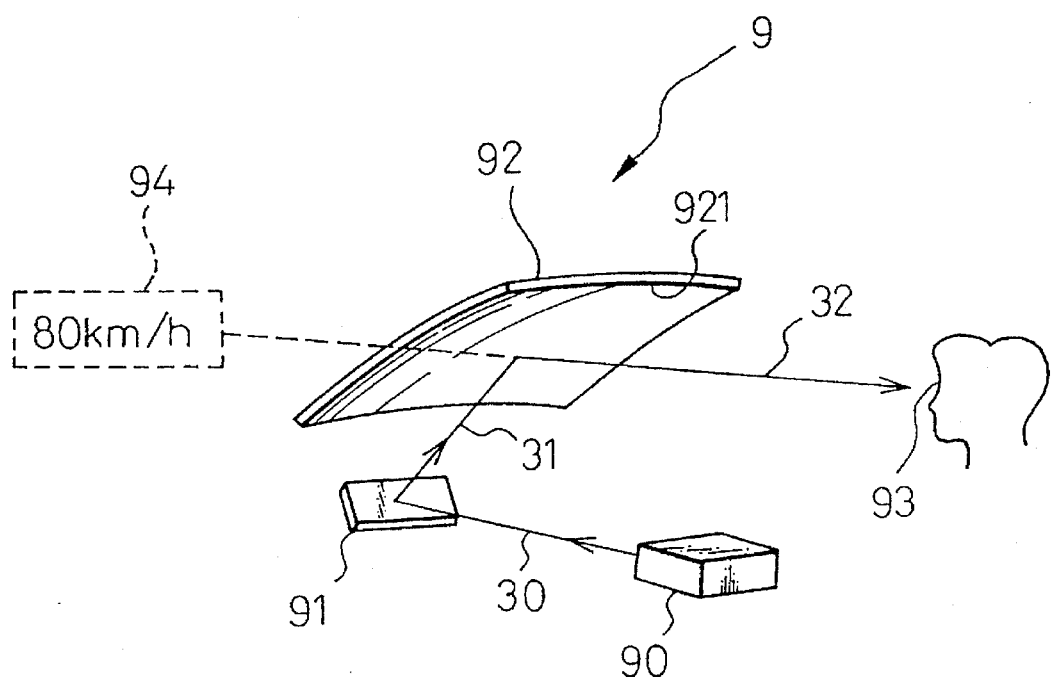
FIG. 19 is a schematic view of a head up display device.
Figure 20:
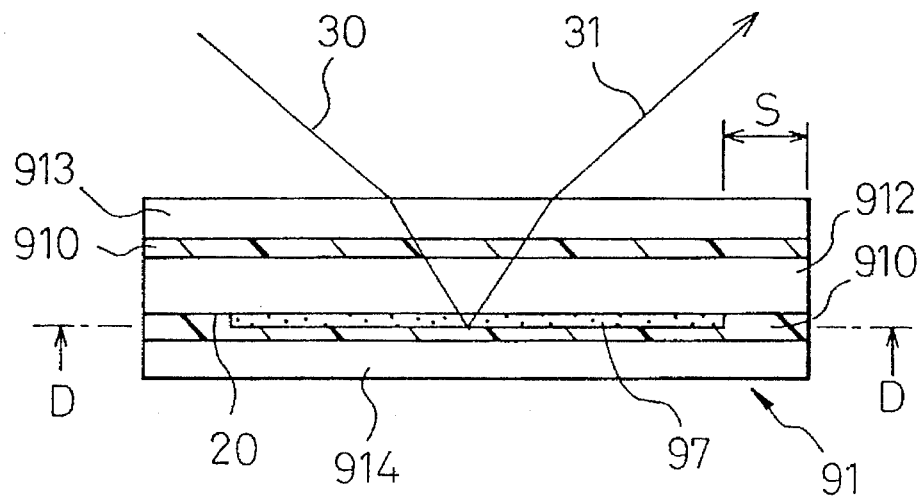
FIG. 20 is a sectional view of a hologram according to a conventional working example.
Figure 21:
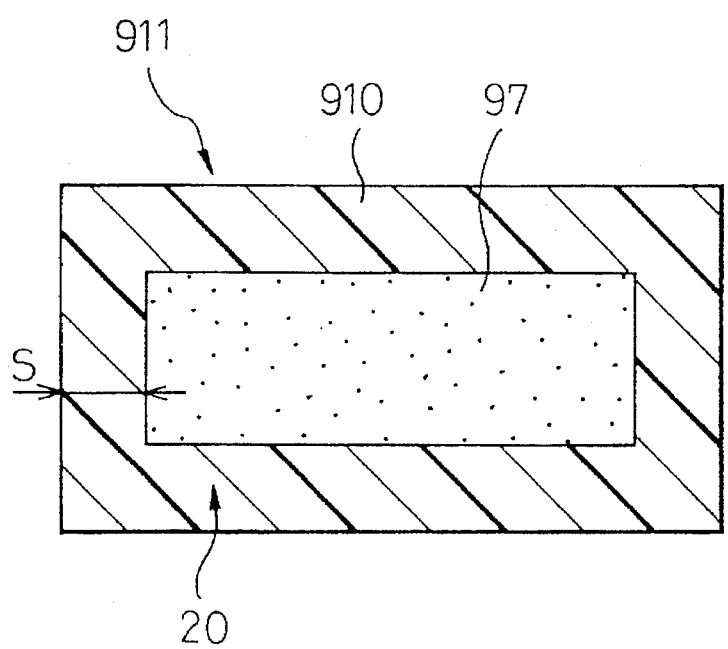
FIG. 21 is a sectional view taken along the line D—D in FIG. 20.

The hologram 17 of the present working example is yused e.g. for a head up display device illustrated in FIG. 19.

The aforesaid head up display device 9 is provided with an annunciator 90 having a light source, a hologram 17 causing a light emitted from said annunciator 90 to diffract and reflect, and a windshield 82 for reflecting the diffracted light 31 from said hologram 17, so as to cause a viewer 95 to visually recognize an image 94 to be displayed.

Onto the aforesaid windshield 82, there is deposited a deposition film for reflecting the aforesaid diffracted light 31.

In the following, a process for the production of the aforesaid hologram will be explained.

First, 0.6 g of ammonium bichromate is dissolved in 100 ml of a 4% solution of gelatin, so as to prepare a solution of gelatin bichromate as a sensitizing agent. The refractive index of the solution of gelatin bichromate is 1.52.

Subsequently, the aforesaid solution of gelatin bichromate is coated on a surface of a glass substrate to a film thickness ranging from 10 to 40 μm, and after the coated solution has been gelled or dried, the glass substrate is allowed to stand for 72 hours under an atmosphere at approximately 20° C. and 50% RH, to stabilize the solution. Thereby, a sensitized film is formed on the glass substrate.

Subsequently, as illustrated in FIG. 3, the glass substrate with the aforesaid sensitized film 210 formed thereon is sandwiched between a convex lens 76 with a focal length of 1000 mm and a prism 77, a silicone oil refractive index-adjusting liquid 75 being interposed therebetween.

Subsequently, an argon beam with a wavelength of 514.5 nm is positioned such that its angle of incidence causes the reproducing light to assume two colors with wavelengths of 540 nm and 600 nm, respectively (when the angle of incidence is 33.5°), and a laser beam with a total power of 500 mJ is used as an incident light 70 from the prism 77 side.

The incident light 70 goes forward rectilinearly toward the convex lens 76 after it has been made to be incident, owing to uniformity of the refractive index, and is reflected by a reflection film 761 formed on the surface, facing the atmosphere, of the convex 76. This reflected light 71 passes again through the sensitized film 210. In this case, the incident light 70 and reflected light 71 interfere with each other on the sensitized film 210.

Figure 4:
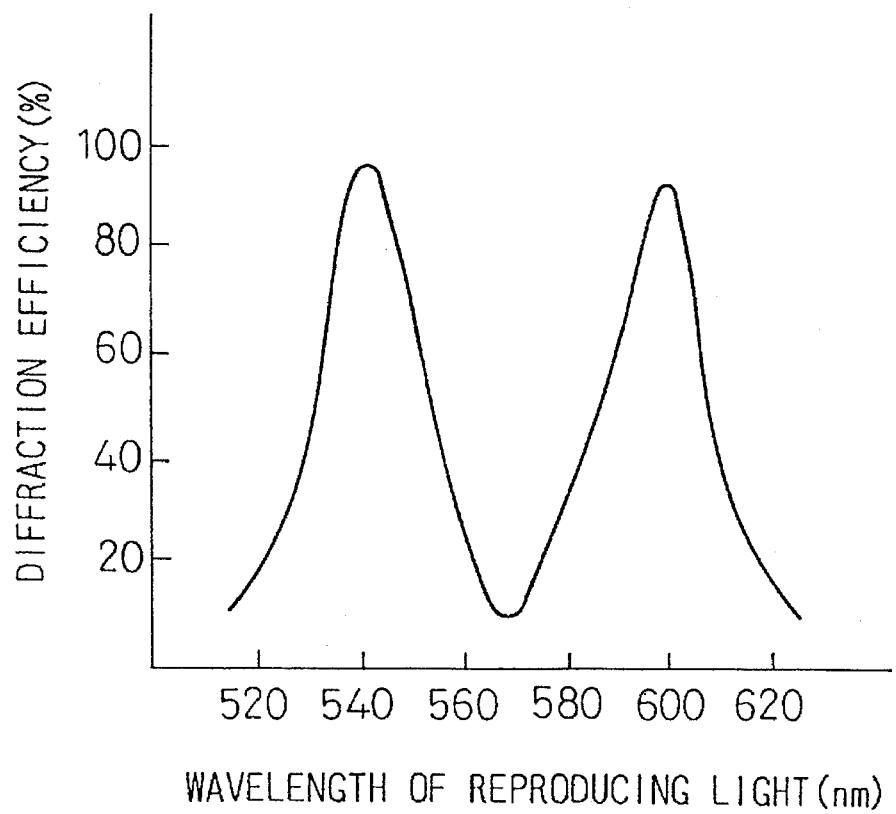
FIG. 4 is a graph showing the relation between the reproduction wavelengths and diffraction efficiencies of a hologram.

A part of the reflected light 71 passes through the refractive index-adjusting liquid 75 and glass substrate 22 without being reflected by the glass substrate 22, and is incident onto the prism 77, whereafter the part of the reflective light 71 is partly reflected on the incident surface of said prism 77. In this case, as illustrated in FIG. 4, it suffices if the angle α of the incident surface of the prism 77 is adjusted for the incident light 70, such that the reflected light on the incident surface of the prism 77 does not go forward toward the sensitized film 210.

By providing the prism 77 in such a way as described above, it is possible to remove display noise caused by reflected light on the boundary surfaces.

In addition, by applying light-absorbing black color coating to the lateral face portion of the prism 77, it is possible to prevent the reflected light on the incident surface of the prism 77 from going forward toward the sensitized film 210.

Thereby, an interference fringe is recorded on the sensitized film 210.

In the present working example, after the assembly illustrated in FIG. 3 had been exposed, it was washed with water until the glass substrate was decolored, and steeped in a commercially available photographic hardening fixer ("Rapid Fixer" produced by Kodack Inc.) for 10 minutes. After the completion of the water washing, the assembly was steeped in a 90% solution of isopropyl alcohol and then in a 100% solution of the same, for 10 minutes, each, whereafter it was hot-air dried. Subsequently, the assembly was subjected to hot aging, such that the wavelength did not suffer any change under use environment.

Figure 13:
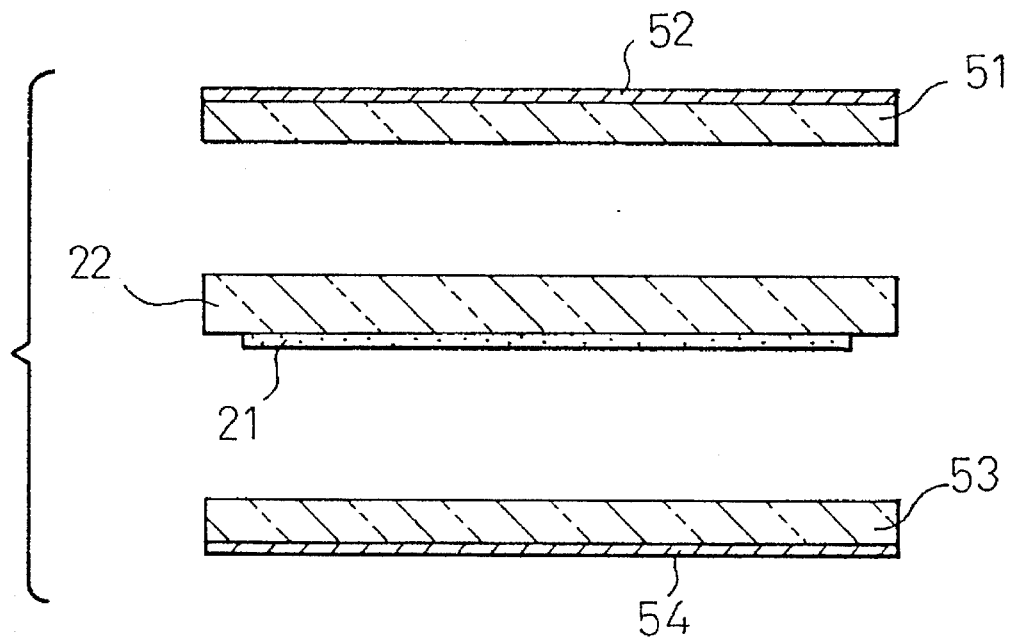
FIG. 13 is an explanatory view illustrating how the glass substrate and cover plates according to the embodiment in FIG. 11 are arranged.

Subsequently, as illustrated in FIG. 13, a cover plate 53 (112 mm×46 mm×1.0 mm) is prepared with a 10 μm thickness antiscattering film 54 formed on the surface. The antiscattering film 54 is prepared by adding a black pigment to an epoxy resin in a proportion of 5% ("Glass Light 500" produced by Cashew Inc.).

On the other hand, a cover plate 51 (112 mm×46 mm×1.0 mm) is prepared with a reflection reducing film 52 formed on the surface. The reflection reducing film 52 assumes a structure such that $MgF_2$ and $TiO_2$ are alternately laminated in 4 layers, and the visual refractive index thereof is 0.3%.

Subsequently, adhesives 12 are coated on the surfaces of the aforesaid cover plates 51 and 53, to a thickness of 50 μm, respectively.

The aforesaid adhesive 12 has the aforesaid compounding composition (see Table 1). The refractive index of the adhesives 12 is 1.52.

Figure 14:
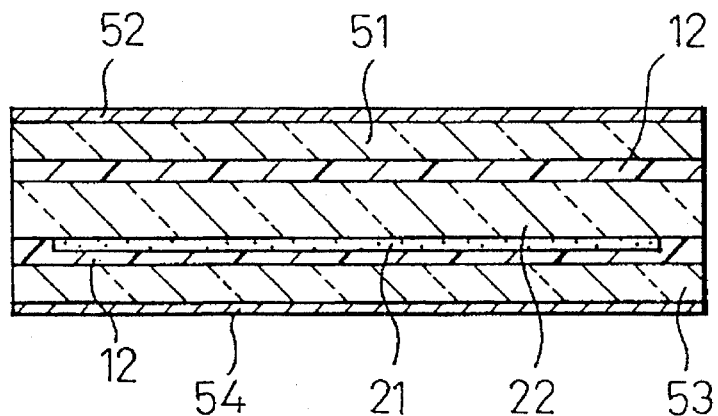
FIG. 14 is an explanatory view illustrating how the glass substrate and cover plates according to the embodiment in FIG. 11 are laminated.

Subsequently, these two cover plates 51 and 53 were arranged for the glass substrate 22 in such a way as illustrated in FIG. 13, and the glass substrate 22 was sandwiched between these two cover plates 51 and 53, by adhesives 12, so as to obtain the hologram illustrated in FIG. 14.

Although, the present working example used cover plates 51 and 53, on the surfaces of which the reflection reducing film 52 and antiscattering film 54 had been preliminarily formed, it is possible to seal the glass substrate 22 with the diffraction grating film 21 formed on the surface, and thereafter apply the aforesaid reflection reducing film 52 or/and antiscattering film 54 to the substrate.

In the following, the water resistance of the aforesaid hologram will be explained.

In the hologram of the present working example, the sealing width S provided on the outer circumferential portion of the diffraction grating film can be approximately half the sealing width required in a conventional hologram while still obtaining sufficient water resistance.

That is, a sealing width S of approximately 2.5 mm was used on the outer circumferential portion of the diffraction grating film of the present working example, to provide sufficient water resistance for 1000 of hours sustained use at 65° C. and 95% RH. However, when an adhesive according to the conventional working example was used, a sealing width S of 5 mm was required to obtain the same water resistance.

In the following, the ultraviolet resistance of the aforesaid hologram will be explained.

When ultraviolet rays were irradiated on the hologram of the present working example for 600 hours or more at a temperature of 85° C., and subsequently, the present hologram was subjected to a color-difference test, no change in the color of the hologram was detected. In addition, the hologram characteristics did not suffer any change. On the other hand, a hologram similar to the hologram of Example 1 was prepared by use of the adhesive (refractive index n=1.55) shown in the aforesaid conventional working example. When the thus prepared hologram was subjected to the same test as described above, the adhesive was partly deteriorated after a period of time ranging from 300 to 400 hours.

From the above results, it can be seen that the adhesive according to the present invention is excellent in ultraviolet resistance.

Nowadays, head up display devices using holograms have been mounted on e.g. automobiles. When a glass laminate composed of polyvinyl butyral (PVB) is used as a windshield of an automobile, it strongly absorbs ultraviolet rays. However, when a windshield of one-glass plate structure is used, its ultraviolet absorption is reduced and the intensity of radiation reaching the hologram is increased. Even in such a case, the hologram of the present invention causes no problems and can be used for a long period of time, owing to its excellent ultraviolet resistance.

Accordingly, in consideration of increased future sales of holograms for small automobiles, it is indispensable to improve the ultraviolet resistance of holograms in conformity with the demand for thinner windshields. Therefore, the effect of the hologram of the present invention is very noticeable.

In the following, the skin irritativeness of the aforesaid hologram will be explained.

The adhesive according to the present working example had an SPI value (skin irritation value of epoxy) of 3, and hardly displayed irritativeness to the skin. Therefore, the present adhesive was easy to handle and special precautions were required. Accordingly, the workability was improved to a great extent.

In the following, the refractive index of the aforesaid hologram will be explained.

The noise ratio of the hologram of the present working example is 0.1%, which is smaller than the noise ratio of 0.2% of the hologram according to the aforesaid conventional working example, and a displayed image obtained therethrough was very clear.

The reason therefor is that, in the present working example, the refractive indices of the cover plates 51 and 53, and glass substrate 22 were set as n=1.52, the refractive index of the diffraction grating film 21 was set as n=1.52, and that of the adhesive 1 was set as n=1.51, and especially at the time of reproduction, reflection at the boundary surfaces among the cover plates and adhesive were further reduced by optimizing the index matching thereamong.

However, since the refractive index of the adhesive according to the conventional working example was n=1.55, the display image was not clear.

Because of the recent demand for improvement of the displayed image, the effect of the adhesive according to the present invention is noteworthy.

In the following, the heat resistance of the aforesaid hologram will be explained.

The characteristics of hologram of the present working example did not deteriorate, even when it was used at a high temperature of 130° C.

However, the maximum usable temperature of a hologram prepared by use of the adhesive according to the aforesaid conventional working example was 120° C.

With respect to increased future sales of holograms, designers have planned to mount simple holograms on the instrument panels of automobiles. Holograms of higher heat resistance than existing holograms are required for mounting on the interior of an instrument panel.

The adhesive of the present working example increases the heat of holograms to 130° C., from the heat resistance of 120° C. of the conventional adhesive. Accordingly, the adhesive of the present working example can be used for a longer period of time as compared with the adhesive according to the conventional working example, even under demanding conditions, and plans can be made for improving the quality and safety of the present adhesive. As described in the foregoing, use of the present adhesive can provide excellent water resistance ultraviolet resistance, and heat resistance, and decrease the skin irritativeness of a hologram, and while yielding a clear image.

EXAMPLE 6

A hologram 17 of the present working example is provided with a diffraction grating film 21 with an interference fringe recorded thereon and a glass substrate 22 provided on one side of the diffraction grating film 21, as illustrated in FIG. 11 and FIG. 12. On both surfaces of the diffraction grating film 21, there are provided cover plates 51 and 53 bound by an adhesive 12.

The aforesaid adhesive 12 adhering the glass substrate 22 with the diffraction grating film 21 provided thereon to the cover plates 51 and 53 consists of a chief ingredient composed of an aromatic epoxy resin mixture with an additive added and a curing agent composed of an amine mixture.

As the aromatic epoxy resin mixture, a resin comprising the three kinds of aromatic epoxy resins of the formulae III to V mixed was used. That is, the aforesaid aromatic epoxy resin mixture is a mixture of a bisphenol A type epoxy of the formula III, the flexible epoxy of the formula IV, and the molecular weight-adjusting epoxy of the formula V.

As the additive to be added to the chief ingredient, diglycidyl ether of the formula VI as a reactive diluent, and the silane coupling agent of the formula VII as an adhesiveness-imparting agent, were used in the present working example. As the aforesaid curing agent composed of an amine mixture, a mixture of an adductized compound of the alicyclic amine of the formula VIII and the modified aliphatic amine of the formula IX was used. With respect to the compounding composition of the aforesaid adhesive, the adhesive contains 54%, of the aromatic epoxy resin mixture (18% of bisphenol A type epoxy, 18% of the flexible epoxy, and 18% of the strain-molecular weight-adjusting epoxy), 5% of the reactive diluent, 1% of the adhesiveness-imparting agent, and 40% of the curing agent (24% of the adductized compound of an alicyclic amine, and 16% of the modified aliphatic amine).

The refractive index of the adhesive of the present working example is 1.52. With respect to the toxicity of the aforesaid adhesive, the SPI value (skin irritativeness of epoxy) is 3 or less for all of the aforesaid components.

The diffraction grating film 21 is a gelatin bichromate film with an interference fringe recorded thereon, and has a thickness ranging from 10 μm to 40 μm.

The glass substrate 22 is made of transparent soda glass and has a dimension of 112 mm×46 mm×18 mm. The refractive index of the glass substrate 22 is 1.52.

The aforesaid hologram 17 causes a light 30 made incident from the reflection reducing film 52 side to diffract and reflect, whereby an image to be displayed, which is caught by the reflected light 31, can be visually recognized by a viewer.

The hologram 17 of the present working example is used e.g. for a head up display device illustrated in FIG. 19.

The aforesaid head up display device 9 is provided with an annunciator 90 having a light source, a hologram 17 causing a light emitted from said annunciator 90 to diffract and reflect, and a windshield 82 for reflecting the diffracted light 31 from said hologram 17, so as to enable a viewer 93 to recognize an image 94 to be displayed.

Onto the aforesaid windshield 82, there is deposited a deposition film 921 for reflecting the aforesaid diffracted light 31.

In the following, a process for the production of the aforesaid hologram will be explained.

First, 0.6 g of ammonium bichromate is dissolved in 100 ml of a 4% solution of gelatin, so as to prepare a solution of gelatin bichromate as a sensitizing agent. The refractive index of the solution of gelatin bichromate is 1.52.

Subsequently, the aforesaid solution of gelatin bichromate is coated on a surface of a glass substrate to a film thickness ranging from 10 to 40 μm, and after the coated solution has been gelled or dried, the glass substrate is allowed to stand for 72 hours under an atmosphere at approximately 20° C. and 50% RH, to stabilize the solution. Thereby, a sensitized film is formed on the glass substrate.

Subsequently, as illustrated in FIG. 3, the glass substrate 22 with the aforesaid sensitized film 210 formed thereon is sandwiched between a convex lens 76 with a focal length of 1000 mm and a prism 77, a refractive index-adjusting liquid 75 being interposed therebetween. As the refractive index-adjusting liquid 75, silicone oil was used in the present working example.

Subsequently an argon laser beam with a wavelength of 514.5 nm is positioned such that its angle of incidence causes the reproducing light to assume two colors with wavelengths of 540 nm and 600 nm, respectively (when the angle of incidence is 33.5°), and a laser beam with a total power of 500 mJ is used as an incident light 70 from the prism 77 side. The incident light 70 goes forward rectilinearly toward the convex lens 76 after it has been made to be incident, owing to uniformity of the refractive index, and is reflected by a reflection film 761 formed on the surface, facing the atmosphere, of the convex 76. This reflected light 71 passes again through the sensitized film 210. In this case, the incident light 70 and reflected light 71 interfere with each other on the sensitized film 210. A part of the reflected light 71 passes through the refractive index-adjusting liquid 75 and glass substrate 22 without being reflected by the glass substrate 22, and is made incident onto the prism 77, whereafter the part of the reflective light 71 is partly reflected on the incident surface of said prism 77. In this case, as illustrated in FIG. 3, it suffices if the angle α of the incident surface of the prism 77 is adjusted for the incident light 70, such that the reflected light 71 on the incident surface of the prism 77 does not go forward toward the sensitized film 210.

By providing the prism 77 as described above, it is possible to eliminate display noise caused by reflected light on the boundary surfaces.

In addition, by applying a light-absorbing black coating to the lateral face of the prism 77, it is possible to prevent the reflected light on the incident surface of the prism 77 from going forward toward the sensitized film 210.

Thereby, an interference fringe is recorded on the sensitized film 210.

In the present working example, after the assembly illustrated in FIG. 3 was exposed, it was washed with water until the glass substrate 22 was decolored, and steeped in a commercially available photographic hardening fixer ("Rapid Fixer" produced by Kodak Inc.) for 10 minutes. After the completion of the water washing, the assembly was steeped in a 90% solution of isopropyl alcohol solution and then in a 100% solution of the same, for 10 minutes each, whereafter it was hot-air dried. Subsequently, the assembly was subjected to hot aging, such that the wavelength did not suffer any change due to its environment. Subsequently, as illustrated in FIG. 13, a cover plate 53 (112 mm×46 mm×1.0 mm) is prepared with a 10 μm thick antiscattering film 54 formed on the surface. The antiscattering film 54 is prepared by adding a black pigment to an epoxy resin in a proportion of 5% ("Glass Light 500" produced by Cashew Inc.). On the other hand, a cover plate 51 (112 mm×46 mm×1.0 mm) is prepared with a reflection reducing film 52 formed on the surface. The reflection reducing film 52 is structured so that $MgF_2$ and $TiO_2$ are alternately laminated in 4 layers, and the visual refractive index thereof is 0.3%. In the head up display assembly illustrated in FIG. 19, the noise image luminance (the display distance is 1.9 m) was measured when the standard image luminance was set to be 3000 $cd/m^2$, so as to obtain a noise ratio in the present working example. In addition, the characteristic diagram of the hologram at this time is illustrated in FIG. 4.

Subsequently, adhesives 12 are coated on the surfaces of the aforesaid cover plates 51 and 53, to a thickness of 50 μm, respectively.

The aforesaid adhesive 12 has the aforesaid compounding composition. The refractive index of the adhesives 12 is 1.52.

Subsequently, these two cover plates 51 and 53 were arranged for the glass substrate 22 as illustrated in FIG. 13, and the glass substrate 22 was sandwiched between these two cover plates 51 and 53, by adhesives 12, so as to obtain a hologram illustrated in FIG. 14, in the present working example.

Although in the present working example, the reflection reducing film 52 and the antiscattering film 54 had already been formed on the cover plates 51 and 53 respectively, it is possible to seal the glass substrate 22 with the diffraction grating film 21 formed on the surface, and thereafter apply the aforesaid reflection reducing film 52 or/and antiscattering film 54 to the substrate.

In the following, the water resistance of the aforesaid hologram will be explained.

In the hologram of the present working example, the sealing width S provided on the outer circumferential portion of the diffraction grating film, as illustrated in FIG. 11 and FIG. 12 can be approximately half the sealing width required in the conventional working example, while still obtaining sufficient water resistance.

That is, a sealing width S of approximately 2.5 mm was used on the outer circumferential portion of the diffraction grating film of the present working example, to provide sufficient water resistance for 1000 hours of sustained use at 65° C. and 95% RH. When an adhesive according to the conventional working example was used, a sealing width S of 5 mm was required to obtain the same water resistance.

In the following, the ultraviolet resistance of the aforesaid hologram will be explained.

After ultraviolet rays were irradiated on the hologram of the present working example for 600 hours or more at a temperature of 85° C., and the present hologram was subjected to a color-difference test, and no change in color was detected. In addition, the hologram characteristics did not suffer any changes. On the other hand, a hologram similar to the hologram of the present working example was prepared by use of the adhesive (refractive index n=1.55) shown in the aforesaid conventional working example. When the thus prepared hologram was subjected to the same test as described above, the adhesive was partly deteriorated after 300 to 400 hours.

From the above results, it can be seen that the adhesive according to the present invention is excellent in ultraviolet resistance.

Nowadays, head up display devices using holograms have been mounted on e.g. automobiles. When a glass laminate composed of polyvinyl butyral (PVB) is used as a windshield of an automobile, the glass laminate strongly absorbs ultraviolet rays. However, when a windshield of one-glass plate structure is used, its ultraviolet absorption is reduced and the intensity of radiation reaching the hologram is increased. However, even in such a case, the hologram of the present invention causes no problems and can be used for a long period of time, owing to its excellent ultraviolet resistance.

Accordingly, in consideration of increased future sales of holograms for small automobiles, it is necessary to improve the ultraviolet resistance of holograms in conformity with the demand for thinner windshields. Therefore, the effect of the hologram of the present invention is very noticeable.

In the following, the skin irritativeness of the aforesaid hologram will be explained.

The adhesive according to the present working example had an SPI value (skin irritation value of epoxy) of 3, and showed little irritativeness to the skin. Therefore, the present adhesive was easy to handle and special precautions were not needed. Accordingly, the workability was improved to a great extent.

In the following, the refractive index of the aforesaid hologram will be explained.

The noise ratio of the hologram of the present working example is 0.1%, which is smaller than the noise ratio of 0.2% of the hologram according to the aforesaid conventional example, and a displayed image obtained therethrough was very clear.

The reason therefor is that, in the present working example, the refractive indices of the cover plates 51 and 53, and glass substrate 22 were set at n=1.52, the refractive index of the diffraction grating film 21 was set at n=1.52, and that of the adhesive 1 was set at n=1.51, and especially at the time of reproduction, reflection at the boundary surfaces among the cover plates and adhesive was further reduced by optimizing the index matching thereamong.

However, since the refractive index of the adhesive according to the conventional working example was n=1.55, the displayed image was not clear.

Because of the recent demand for improvement of the displayed image, the effect of the adhesive according to the present invention is noteworthy.

As described in the foregoing, use of the adhesive of the present working example, can provide excellent water resistance and ultraviolet resistance, and decrease skin irritativeness, while yielding a clear image.

EXAMPLE 7

In the present working example, as the curing agent for an adhesive, a mixture of the modified aromatic amine of the formula X and the alicyclic amine of the formula XI was used. The other details such as the chief ingredient of the adhesive and the structure of a hologram are the same as in Example 6.

With respect to the compounding composition of the aforesaid adhesive, the adhesive contains 54% of the aromatic epoxy resin mixture (18% of a bisphenol A type epoxy, 18% of the flexible epoxy, and 18% of the strain-molecular weight-adjusting epoxy), 5% of a reactive diluent, 1% of an adhesiveness-imparting agent, and 40% of the curing agent (24% of an adductized compound of a modified aromatic amine, and 16% of an alicyclic amine).

The refractive index of the adhesive of the present working example is 1.52. In addition, with respect to the toxicity of the aforesaid adhesive, the present adhesive exhibits an SPI value of 3 or less for all the ingredients thereof.

Accordingly, also in the present working example, like in Example 6, there can be produced a hologram which is excellent in water resistance and ultraviolet resistance and scarcely exhibits irritativeness to the skin, and which produces a clear image.

EXAMPLE 8

Figure 15:
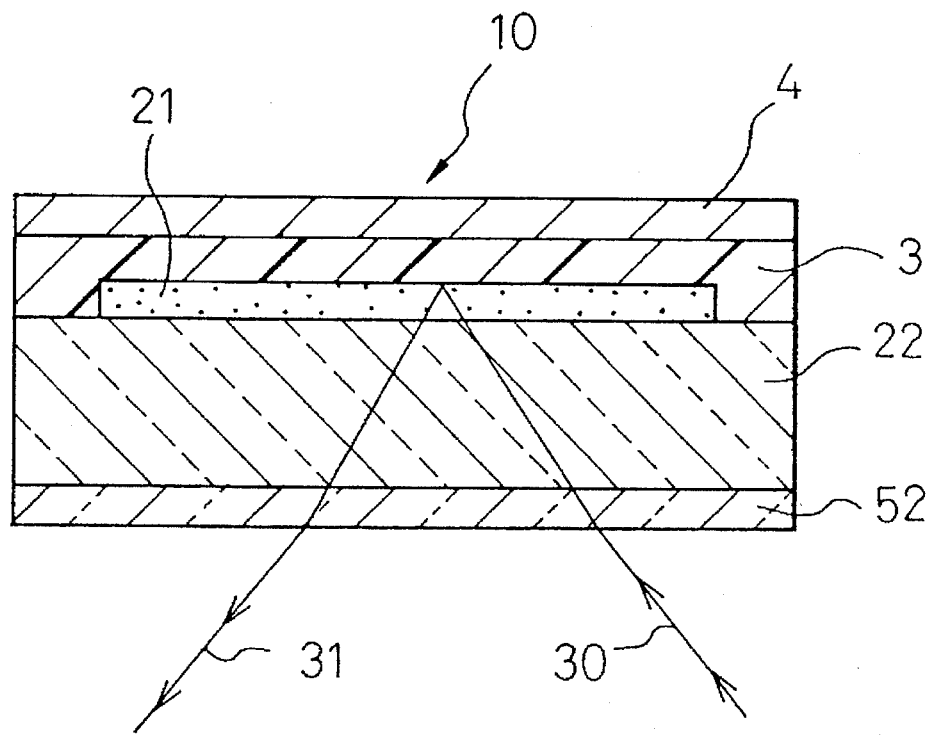
FIG. 15 is a sectional view of a hologram according to another embodiment of the present invention.

The hologram of the present working example is provided with a diffraction grating film 21 with a recorded interference fringe thereon and a glass substrate 22 provided on one side of the diffraction grating film 21, as illustrated in FIG. 15.

To the surface of the diffraction grating film 21, there is adhered a metallic foil 4 by an adhesive 3.

Specific examples of the metallic foil 4 include a 50 Ni 50 Fe alloy (coefficient of thermal expansion: $9.5 \times 10^{-6}$), Ni-Cr alloy (coefficient of thermal expansion: $12 \times 10^{-6}$) or the like.

The thickness of the metallic foil is between 20 and 200 μm.

The metallic foil 4 is adhered to the surface of the diffraction grating film 21 by the adhesive 3. As the adhesive 3, a water-resisting optical epoxy type thermosetting adhesive ("Cemedyne CS 2340-5" or "DSES-1010" produced by Nippon Denki K.K.) is used. In particular, the latter "DESE-1010" is an adhesive for printing and has a high viscosity. Therefore, the latter adhesive can be coated with low waste. The thickness of the coated adhesive is between 5 and 100 μm. In addition, a blacking agent such as carbon black is added to the adhesive 3 in a proportion ranging from 5 to 40% by weight, so that the adhesive 3 assumes a black color.

The diffraction grating film 21 is a gelatin bichromate film with an interference fringe recorded thereon, and has a thickness ranging from 10 μm to 40 μm.

The substrate 22 is made of transparent soda glass and measures 112 mm×46 mm×1.8 mm. The refractive index of the substrate 22 is 1.52.

On the surface of the substrate 22, facing the atmosphere, there is formed a reflection reducing film 52 comprising $MgF_2$ and $TiO_2$ laminated alternately.

The aforesaid hologram 10 is used for e.g. a head up display device 9 illustrated in FIG. 19. In this device 9, the hologram 10 causes a light 30 emitted from an annunciator 90 to diffract and reflect and irradiates the diffracted light 31 to a reflection film 92, so as to enable a viewer to recognize a image 94 to be displayed.

In the following, a process for the production of the aforesaid hologram 10 will be explained.

Figure 16:
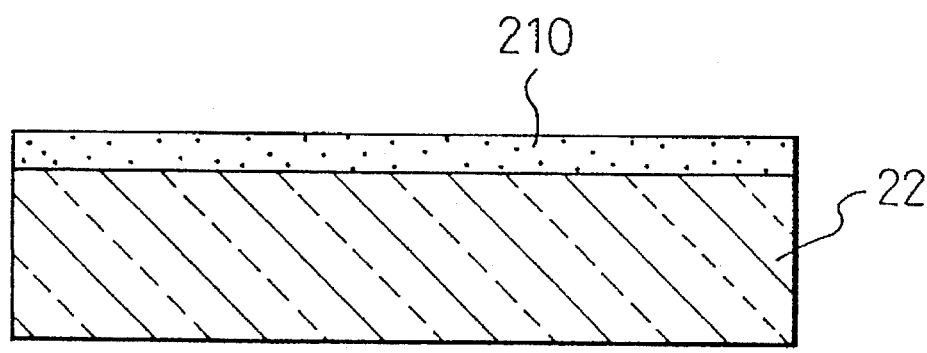
FIG. 16 is a sectional view of a substrate with a diffraction grating film formed thereon, according to the embodiment in FIG. 15.

First, as illustrated in FIG. 16, on the substrate 22 measuring 112 mm×46 mm×1.8 mm, there is formed a gelatin bichromate film as a sensitized film 20 with a thickness of 25 μm. The sensitized film 20 is prepared by dissolving 0.6 g of ammonium bichromate in 100 ml of a 4% solution of gelatin, and the refractive index thereof is approximately 1.55.

Subsequently, in the present working example, the substrate 22 with this sensitized film 210 formed thereon was allowed to stand for 72 hours in a dehydrator maintained in an atmosphere at 20° C. and 50% RH, to stabilize the sensitized film.

Thereafter, in the assembly illustrated in FIG. 3, an argon laser beam with a wavelength of 514.5 nm was positioned such that its angle of incidence caused the reproducing light to assume two colors with wavelengths of 540 nm and 600 nm, respectively (when the angle of incidence was 33.5°), and an argon laser beam with a total power of 500 mJ exposed the sensitized film 210, so as obtain a diffraction grating film with an interference fringe recorded thereon. The focal length of the lens 76 in FIG. 3 was 1000 mm.

Herein, recording of an object on the sensitized film 210 is generally performed as illustrated in FIG. 3. First, a substrate 22 with a sensitized film 210 formed thereon is sandwiched between a lens 76 with a predetermined focal length and a prism 77, a silicone oil refractive index-adjusting liquid 75 being interposed therebetween.

From the prism 77 side, an argon laser beam with a wavelength of 514.5 nm is used as an incident light 70. After the incidence of the argon laser beam, the incident light 70 goes forward rectilinearly toward the lens 76, owing to the uniformity of the refractive index, and is reflected by a reflection film 761 formed on the surface of the lens 76, facing the atmosphere. This reflected light 71 and the aforesaid incident light 70 interfere with each other on the sensitized film 210. Thereby, an interference fringe is recorded on the sensitized film 210. In addition, a part of the reflected light 71, which has passed through the sensitized film 210, passes through the substrate 22 and refractive index-adjusting liquid 75 and is incident onto the prism 77. Subsequently, a part of the reflected light is reflected on the incident surface of the prism 77.

In this case, by adjusting the angle α of the incident surface of the prism 77 to 30°, the reflected light 71 on the incident surface of the prism 77 is prevented from going forward toward the sensitized film 210.

By providing the prism 77 as described above, it is possible to eliminate a display noise caused by reflected light on the boundary surfaces. In addition, by applying a light-absorbing black coating to the lateral surface of the prism 77, it is possible to prevent the reflected light 71 on the incident surface of the prism 77 from going forward toward the sensitized film 210. This prevents noise images from being recorded at the time of reproduction and recording on the sensitized film 210 through the lens 76.

After the assembly illustrated in FIG. 16 was exposed, it was washed with water until the aforesaid substrate 22 was decolored, and steeped in a commercially available photographic hardening fixer ("Rapid Fixer" produced by Kodak Inc.) for 10 minutes. After the completion of the water washing treatment, the assembly was steeped in a 90% solution of isopropyl alcohol and then in a 100% solution of the same, for 10 minutes, respectively, whereafter it was hot-air dried. Subsequently, the assembly was subjected to hot aging, such that the wavelength did not suffer any change due to the environment.

Thus, a diffraction grating film with an interference fringe recorded thereon is thereby obtained.

Figure 17A:
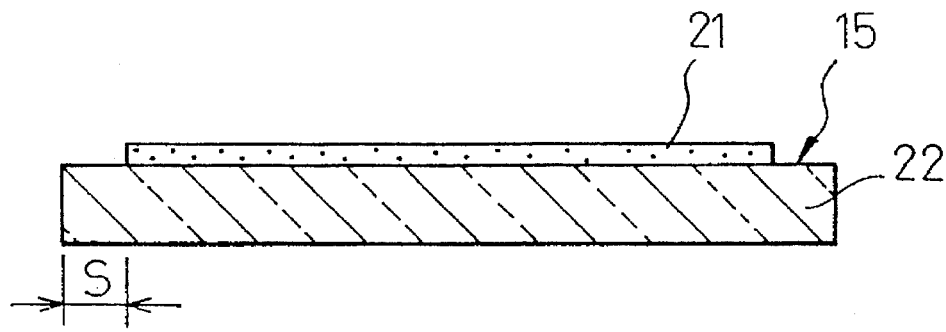
FIGS. 17(a) and 17(b) are sectional views of a hologram photographic dry plate according to the embodiment in FIG. 15.
Figure 17B:
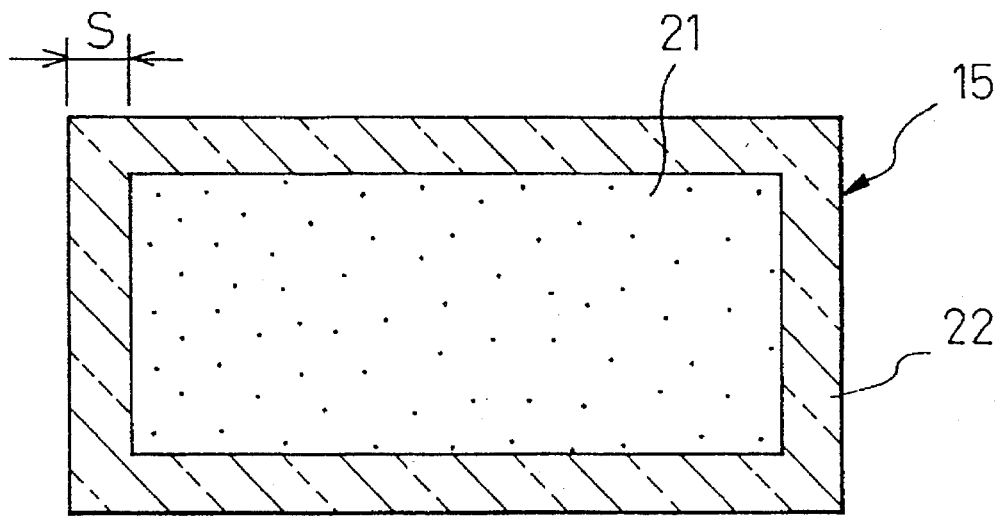

Subsequently, as illustrated in FIGS. 17(a) and 17(b), the circumference of the diffraction grating film 21 is removed and a sealing width S is provided on the outer circumferential portion of the diffraction grating film 21, yielding a hologram dry plate 15 consisting of the diffraction grating film 21 and the substrate 22 with said diffraction grating film 21 disposed thereon.

The sealing width S is preferably between approximately 3 and 8 mm, although the width can vary according to the circumstances of the holograms use.

Figure 18:
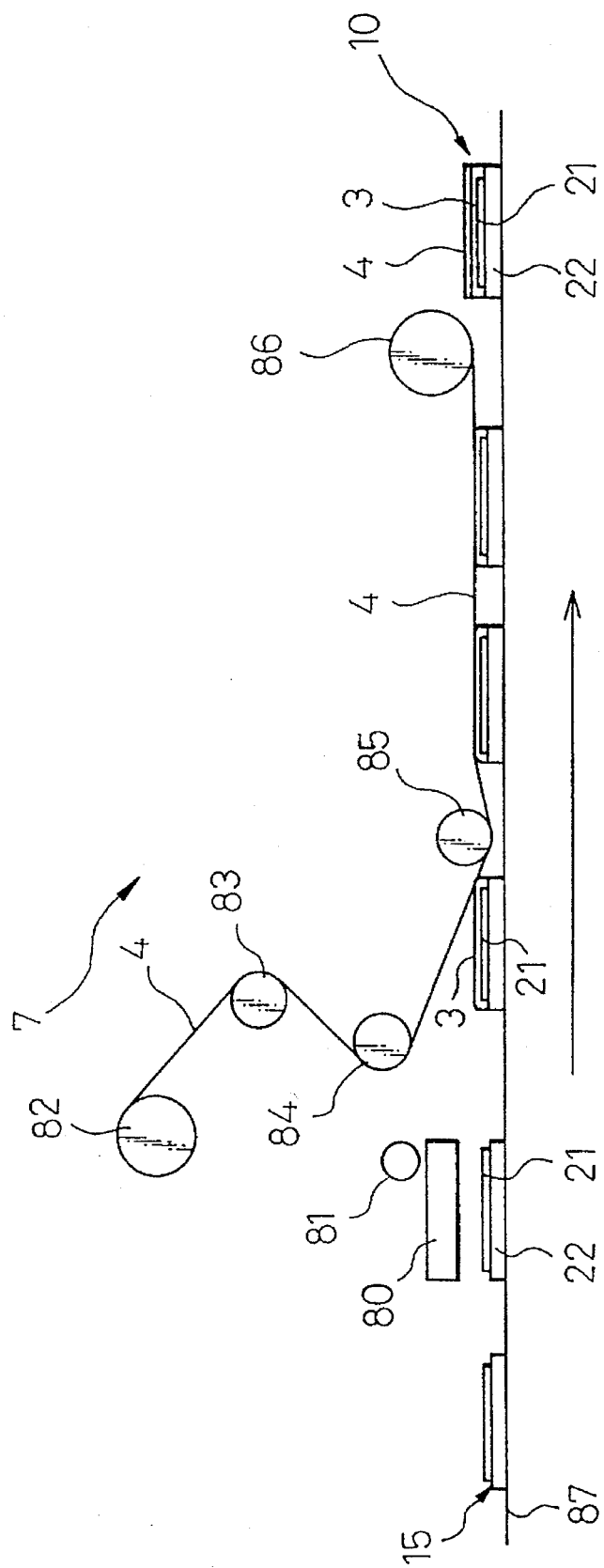
FIG. 18 is an explanatory view illustrating how to adhere a metallic foil to a hologram dry plate, according to the embodiment in FIG. 15.

Subsequently, as illustrated in FIG. 18, by use of a metallic foil-sticking device 7, an adhesive was printed on the aforesaid hologram dry plate, and a metallic foil 4 was adhered thereto.

That is, first, over almost all the surface of one side of the substrate 22 covered with the aforesaid diffraction grating film 21, there is printed or applied an adhesive 3 with a uniform thickness ranging from 5 to 100 μm, by use of a printer 80 and a roller 81. It is thereby possible to adhere the metallic foil 4 in parallel with the diffraction grating film 21, preventing the overflow of the adhesive and appearance of surface sink, in the subsequent metallic foil-sticking step.

In the present working example, as the adhesive 3, a water-resisting and high viscosity adhesive, DSES-1010 was used, as described in the foregoing. To this printing adhesive, there had preliminarily been added the aforesaid blacking agent.

In addition, it is not recommendable to print or to apply the adhesive 3 to a region approximately 1 mm from the margin of the lateral face of the substrate 22 on the surface thereof. This is to prevent the adhesive from being pressed out, in the case of pressing the hologram dry plate 15 and metallic foil 4 against each other as will be mentioned later.

On the other hand, the tape-shaped metallic foil 4 wound around a roller 82 is adhered to the surface of the substrate 22 with the aforesaid adhesive 3 printed thereonto, while the metallic foil 4 is advanced in regular succession by rollers 83 to 85. In this case, it is recommendable to once press the adhesive 3 and metallic foil 4 against each other on the surface of the roller 85. It is thereby possible to adhere them closely to each other without causing air bubbles to be mixed between the adhesive 3 and metallic foil 4.

After the completion of the adhering operation, the substrate 22 is heated at a temperature ranging from 100° to 120° C. for 30 to 60 minutes, so as to cure the adhesive 3.

Subsequently, the tape-shaped metallic foil 4 is cut out at the portion thereof adhered closely to the substrate 22.

Thereafter, a reflection reducing film is formed on the substrate 22 at the surface thereof facing the atmosphere. Thereby, the hologram 10 illustrated in FIG. 15 is formed.

In the following, the function and effect of the present working example will be explained.

In the hologram 10 of the present working example, a surface of the diffraction grating film 21 is covered with the metallic foil 4. The metallic foil 4 is light and thin. Accordingly, the hologram 10 can be prepared as a light and thin product. In addition, the structure of the hologram can be simplified.

In addition, since the metallic foil 4 is likely to be curved, it can absorb some degree of strain. In addition, the metallic foil 4 is easy to handle. It is therefore possible to easily and continuously adhere the metallic foil 4 to the diffraction grating film 21.

In addition, since the metallic foil 4 is high in water resistance, it is possible to prevent moisture from being brought into contact with the surface of the diffraction grating film 21.

We claim:

1. A hologram comprising:

a substrate;

a cover plate;

a diffraction grating film having an interference fringe recorded therein, said diffraction grating film being provided between said substrate and said cover plate; and a water repellent layer impregnated with wax, said water repellent layer covering a lateral face portion of said diffraction grating film.

2. A hologram as claimed in claim 1, wherein said water repellent layer additionally comprises one or more resins selected from the group consisting of epoxy resins, phenolic resins, butyral resins, acrylic resins, silicon resins, urethane resins and fluorine resins.

3. A hologram comprising:

a substrate;

a cover plate;

a diffraction grating film having an interference fringe recorded therein, said diffraction grating film being provided between said substrate and said cover plate; and a water repellent layer composed of a moisture resistance processing agent selected from the group consisting of acryls, polyolefins, butyl-modified rubber, and fluoroacrylates, said water repellent layer covering a lateral face portion of said diffraction grating film wherein said water repellent layer is impregnated with wax.

4. A hologram comprising:

a diffraction grating film having an interference fringe recorded therein;

a substrate provided on one side of said diffraction grating film; and a water repellent layer impregnated with wax, said water repellent layer covering a surface of said diffraction grating film.

5. A hologram as claimed in claim 4, wherein said water repellent layer is additionally composed of one or more resins selected from the group consisting of epoxy resins, phenolic resins, butyral resins, acrylic resins, silicone resins, urethane resins, and fluorine resins.

6. A hologram comprising:

a diffraction grating film having an interference fringe recorded therein;

a substrate provided on one side of said diffraction grating film; and a water repellent layer covering a surface of said diffraction grating film, wherein said water repellent layer is composed of a moisture resistance processing agent selected from the group consisting of acryls, polyolefins, and butyl-modified rubber, wherein said water repellent layer is impregnated with wax.

* * * * *